United States Patent
Suzuki et al.

(10) Patent No.: US 6,256,349 B1
(45) Date of Patent: *Jul. 3, 2001

(54) PICTURE SIGNAL ENCODING METHOD AND APPARATUS, PICTURE SIGNAL TRANSMITTING METHOD, PICTURE SIGNAL DECODING METHOD AND APPARATUS AND RECORDING MEDIUM

(75) Inventors: Teruhiko Suzuki, Chiba; Yoichi Yagasaki, Kanagawa, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/772,894

(22) Filed: Dec. 24, 1996

(30) Foreign Application Priority Data

Dec. 28, 1995 (JP) .................................................. 7-344146

(51) Int. Cl.[7] ........................................................ H04B 1/66
(52) U.S. Cl. ............................................................ 375/240.18
(58) Field of Search ...................................... 348/403, 409, 348/410, 411, 412, 413, 416, 398; 386/68, 109; 340/825; 382/239, 244, 240; 714/736; 375/240.18; H04N 5/92, 7/12; H04B 1/66

(56) References Cited

U.S. PATENT DOCUMENTS

| | | | |
|---|---|---|---|
| 4,315,249 | * 2/1982 | Apple et al. | 340/825 |
| 4,903,317 | * 2/1990 | Nishihara et al. | 382/244 |
| 5,481,553 | * 1/1996 | Suzuki et al. | 348/403 |
| 5,604,494 | * 2/1997 | Murakami et al. | 348/416 |
| 5,627,581 | * 5/1997 | Kondo | 348/390 |
| 5,652,823 | * 7/1997 | Eto | 386/68 |
| 5,701,160 | * 12/1997 | Kimura et al. | 348/413 |

* cited by examiner

*Primary Examiner*—Chris Kelley
*Assistant Examiner*—Gims Philippe
(74) *Attorney, Agent, or Firm*—Frommer Lawrence & Haug, LLP.; William S. Frommer; Dennis M. Smid

(57) ABSTRACT

There is provided a picture signal encoding method in which a signal obtained on processing picture signals with encoding accompanying real-number calculations and the resulting quantized signal is outputted, locally decoded data of the encoded data and data prevailing prior to execution of the real-number calculations are compared to each other to find a difference signal. This difference signal is added to decoded data for signal correction for realizing reversible encoding and the encoding/decoding of high-precision picture signals. Also provided are a corresponding signal encoding apparatus, a picture signal transmitting method, a picture signal decoding method and apparatus and a recording medium having thereon recorded signal decodable by the picture decoding apparatus

23 Claims, 10 Drawing Sheets

US 6,256,349 B1

PICTURE SIGNAL ENCODING METHOD AND APPARATUS, PICTURE SIGNAL TRANSMITTING METHOD, PICTURE SIGNAL DECODING METHOD AND APPARATUS AND RECORDING MEDIUM

BACKGROUND OF THE INVENTION

1. Field of the Invention

This invention relates to a picture signal encoding method and apparatus, a picture signal transmitting method, a picture signal decoding method and apparatus and a recording medium having thereon recorded signal decodable by the picture decoding apparatus. More particularly, it relates to a picture signal encoding method and apparatus, a picture signal transmitting method, a picture signal decoding method and apparatus and a recording medium, that may be employed with advantage for recording moving picture signals on a recording medium, such as a magneto-optical disc or a magnetic tape, transmitting the picture signals over a transmission channel, or reproducing the moving picture signals.

2. Description of the Related Art

In a system for transmitting moving picture signals to a remote place, such as a video conferencing system or a video telephone system, picture signals are encoded for data compression by utilizing line-to-line correlation or frame-to-frame correlation of picture signals for efficient utilization of the transmission channel.

If line-to-line correlation (two-dimensional correlation) is utilized, data compression can be achieved by processing picture signals by, for example, digital cosine transform (DCT) for concentrating the signal power in specified frequency components.

If frame-to-frame (or field-to-field) correlation is utilized, the picture signals can be further compressed for encoding. That is, since pictures of temporally neighboring frames are not vitally changed from each other, difference signals obtained on computing the difference between these frames are of smaller values. Therefore, the amount of the codes can be compressed by encoding these difference signals.

However, if only the difference signals are transmitted, the original picture cannot be restored. Thus, the frame pictures are classed into three different sorts, that is an I-picture, a p-picture and a B-picture, and the picture signals are encoded for compression. This compression technique is used in the encoding standards by the Moving Picture Image Experts Group (MPEG). This MPEG, discussed in ISO-IEC/JTC1/SC2/WG11 and proposed as a draft standard, is of a hybrid system consisting in the combination of the motion-compensated predictive coding and the discrete cosine transform (DCT), as proposed in, for example, the U.S. Pat. No. 5,155,593, issued on Oct. 13, 1992.

For example, picture signals of 17 frames of from frame F1 to frame F17 are grouped together as a group-of-picture (GOP) asa processing unit. The picture signals of the leading frame F1, second frame and the third frame are encoded as I-, B- and P-pictures, respectively. The fourth to seventeenth frames F4 to F17 are processed as B- and P-pictures alternately.

The picture signal, encoded as an I-picture, are directly transmitted as picture signals of a full frame or field. As for the picture signals, encoded as a P-picture, basically the difference from the temporally previous I- or P-picture is transmitted. As for the picture signals, encoded as a B-picture, basically the difference from an average value of a temporally previous frame F1 and a temporally posterior frame F3 is computed and encoded.

Thus, in encoding moving picture signals, the first frame F1 is processed as an I-picture, and hence is directly transmitted as transmission data on the transmission channel (intra-frame coding). On the other hand, since the second frame F2 is processed as a B-picture, basically the difference from an average value between the temporally previous frame F1 and the temporally posterior frame F3 is computed and the difference is transmitted.

More specifically, the encoding as the B-picture is subdivided into four sorts of encoding. The first processing is transmitting data of the original frame F2 directly as transmission data (intra-coding or intra-picture predictive coding). This processing is similar to that for an I-picture. The second processing is computing the difference from the temporally posterior frame F3 and transmitting the difference (backward predictive coding). The third processing is transmitting the difference from the temporally previous frame F1 (forward predictive coding). The fourth processing is generating the difference from an average value between the temporally previous frame F1 and the temporally posterior frame F3 and transmitting the difference as transmission data (bidirectional predictive coding).

Of these four methods, such a method as will minimize the volume of the transmission data is used.

Meanwhile, when transmitting the difference data, a motion vector x1 between the picture of an original frame and the picture of a frame the difference of the original frame from which is computed (prediction picture) which, in the case of forward prediction, is a motion vector between the frames F1 and F2, a motion vector x2 which, in the case of backward prediction, is a motion vector between the frames F3 and F2, or both the vectors x1 and x2, are transmitted along with the difference data.

As for the frame F3 of the P-picture, basically the temporally previous frame F1 is used as a prediction picture, difference data between the frame F3 and the temporally previous frame F1 and the motion vector x3 are computed, and the difference data and the motion vector x3 are transmitted as transmission data (forward predictive coding).

The processing as the P-picture is subdivided into two processing sorts. The first processing is transmitting the difference of the frame F3 from the temporally previous frame F1 (forward predictive coding). The second processing is directly transmitting data of the original frame F3 (intra-coding or intra-picture predictive coding). Which of these processing methods is used is determined depending which method gives a smaller amount of transmission data, as in the case of the B-picture.

Meanwhile, with the conventional picture signal encoding and decoding method or apparatus, transform coding, such as discrete cosine transform (DCT) is used for encoding. In executing the DCT, which is the real-number precessing operation, the processing is terminated with a finite word length if an actual DCT circuit is used. Thus, if an IDCT processing is done on an IDCT circuit after DCT processing on a DCT circuit, the information of the original signal IS partially lost.

Therefore, if the real-number processing, such as DCT, is used on an encoding/decoding apparatus, reversible coding, which is a technique required for precision picture signals, cannot be actually used.

SUMMARY OF THE INVENTION

It is therefore an object of the present invention to enable reversible coding even in picture signal encoding/decoding employing real-number processing, such as DCT.

In one aspect, the present invention provides a picture signal encoding method for outputting a signal obtained on processing a picture signal with encoding accompanying real-number calculations. The encoding method includes a step of processing the input picture signal with encoding accompanying real-number calculations for generating encoded data, a step of locally decoding the encoded data for generating locally decoded data, and a step of comparing the locally decoded data to picture data prevailing prior to performing the real-number calculations for calculating a difference.

In another aspect, the present invention provides a picture signal encoding apparatus for outputting a signal obtained on processing a picture signal with encoding accompanying real-number calculations. The encoding apparatus includes means for processing the input picture signal with encoding accompanying real-number calculations for generating encoded data, means for locally decoding the encoded data for generating locally decoded data, and means for comparing the locally decoded data to picture data prevailing prior to performing the real-number calculations for calculating a difference.

In another aspect, the present invention provides a picture signal transmitting method for transmitting a signal obtained on processing a picture signal with encoding accompanying real-number calculations. The transmitting method includes a step of processing the input picture signal with encoding accompanying real-number calculations for generating encoded data, a step of locally decoding the encoded data for generating locally decoded data, a step of comparing the locally decoded data to picture data prevailing prior to performing the real-number calculations for calculating a difference and a step of transmitting the encoded data along with the difference data.

In still another aspect, the present invention provides a recording medium decodable by a decoding apparatus in which the recording medium has recorded signals decodable by the decoding apparatus. The recorded signals include encoded data and difference data. The recorded signals are recorded by a method including a step of processing the input picture signal with encoding accompanying real-number calculations for generating encoded data, a step of locally decoding the encoded data for generating locally decoded data, and a step of comparing the locally decoded data to picture data prevailing prior to the real-number calculations for calculating a difference.

In still another aspect, the present invention provides a picture signal decoding method in which original picture data is restored by decoding from encoded data obtained on processing picture signals with encoding accompanying real-number calculations and from difference data signals obtained on finding the difference between locally decoded data of the encoded data and picture data prevailing prior to performing the real-number calculations. The decoding method includes a step of decoding the encoded signals by decoding as a counterpart of the encoding for generating decoded data, and a step of summing the difference data to the decoded data.

In yet another aspect, the present invention provides a picture signal decoding apparatus in which original picture data is restored by decoding from encoded data obtained on processing picture signals with encoding accompanying real-number calculations and from difference data signals obtained on finding the difference between locally decoded data of the encoded data and picture data prevailing prior to performing the real-number calculations. The decoding apparatus includes means for decoding the encoded signals by decoding as a counterpart of the encoding for generating decoded data, and means for summing the difference data to the decoded data.

With the picture signal encoding method according to the represent invention, in which a signal obtained on processing picture signals with encoding accompanying real-number calculations and the resulting quantized signal is outputted, locally decoded data of the encoded data and data prevailing prior to execution of the real-number calculations are compared to each other to find a difference signal. This difference signal is added to decoded data for signal correction for realizing reversible encoding and hence the encoding/decoding of high-precision picture signals.

Also, representative value data and the quantization width are determined every pre-set block and the difference between the picture data and the representative value data is found and quantized based on the quantization width to generate first quantized data. The first quantized data is processed with preset transform and the resulting transform coefficients are quantized to generate second-quantized data. The representative value data, quantization width and the second quantized data are quantized. Thus the picture can be encoded and decoded at the same time as its bit precision is varied.

DESCRIPTION OF THE PREFERRED EMBODIMENTS

Figure 1:
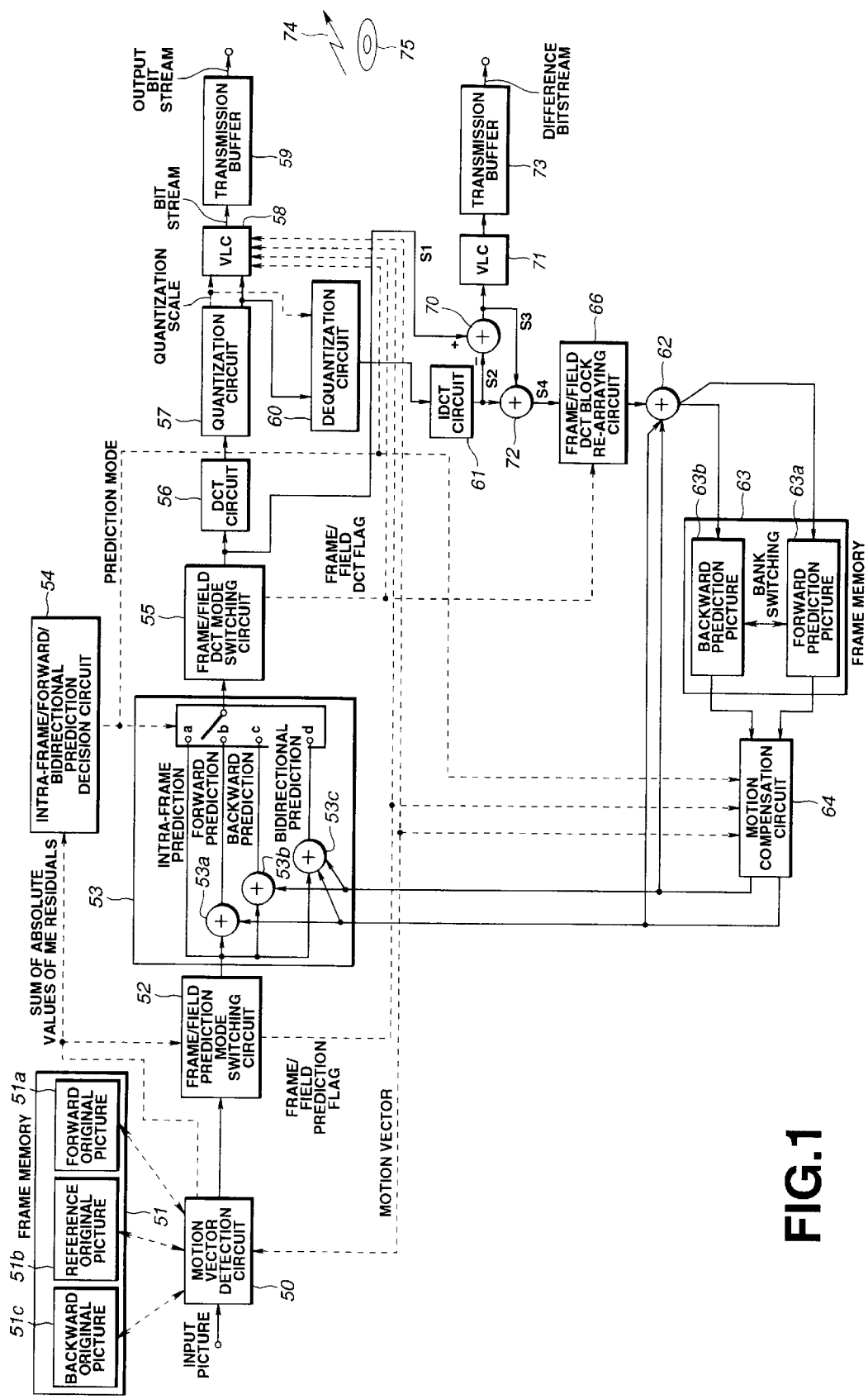
FIG. 1 is a block diagram showing the structure of a picture signal encoding apparatus according to a first embodiment of the present invention.

Referring to the drawings, certain preferred embodiments of a picture signal encoding method and apparatus, a picture signal transmitting method, a picture signal decoding method and apparatus and a recording medium having thereon recorded signals decodable by the picture decoding apparatus, will be explained in detail.

FIG. 1 illustrates the structure of a picture signal encoding apparatus according to a first embodiment of the present invention.

In the embodiment of FIG. 1, a signal S1 prevailing prior to DCT processing, to be supplied to a discrete cosine transform (DCT) circuit 56, is sent to a subtractor 70, while a signal S2, processed by a DCT circuit 56, a quantization circuit 57 and a dequantization circuit 60 and inverse-discrete-cosine transformed by an inverse discrete cosine transform (IDCT) circuit 61, is sent to the subtractor 70. The IDCT processed signal S2 is subtracted from the signal S1 prevailing prior to DCT processing to find a difference signal S3 which is variable-length encoded by a variable length encoding circuit 71 so as to be outputted via a transmission buffer 73 as a difference bitstream.

In the picture signal encoding apparatus, shown in FIG. 1, picture data to be encoded is fed to a motion vector detection circuit 50 on the macro-block basis. The motion vector detection circuit 50 processes the picture data of respective frames as I-, P- or B-pictures in accordance with a pre-set sequence. The frame pictures, entered sequentially, are processed as I-, P- or B-pictures in a pre-determined sequence.

Each macro-block is constituted by luminance signals in an array of 16×16 dots on the screen which is subdivided into four blocks each in an array of 8×8 dots. The 16×16 dot luminance signals are associated with 8×8 dot Cb signals and 8×8 dot Cr signals.

The picture data of a frame to be processed as an I-picture is transferred from the motion vector detection circuit 50 to a forward original picture unit 51a of the frame memory 51 for storage therein. The picture data processed as a B-picture is transferred to an original picture unit 51b for storage therein, while the picture data of a frame to be processed as a P-picture is transferred to a backward original picture unit 51c of the frame memory 51 for storage therein.

When the picture of a frame to be processed as a B- or P-picture is supplied at the next timing, the picture data of the first P-picture, so far stored in the backward original picture unit 51c, is transferred to the forward original picture unit 51a. The picture data of the next B-picture is stored (overwritten) in the original picture unit 51b while the picture data of the next P-picture is stored (overwritten) in the backward original picture unit 51c. The above-described sequence of operations is performed repeatedly.

The signals of the respective pictures, stored in the frame memory 51, are read out therefrom and sent to the motion vector detection circuit 51 and to a frame/field prediction mode switching circuit 52. The prediction mode switching circuit 52 performs frame prediction mode processing or field prediction mode processing. In a processing unit 53, processing for intra-picture prediction, forward prediction, backward prediction or bidirectional processing is performed under control by a prediction decision circuit 54. Which of these prediction operations is performed is determined depending on a prediction error original (difference between a picture under consideration, that is a reference picture, and a corresponding prediction picture). Thus the motion vector detection circuit 50 generates a sum of absolute values of the prediction error signals used for this decision.

The frame prediction mode and the field prediction mode in the prediction mode switching circuit 52 is now explained.

If the frame prediction mode is set in the prediction mode switching circuit 52, the prediction mode switching circuit 52 directly outputs four luminance blocks Y[1] to Y[4], supplied from the motion prediction circuit 50, to the downstream side processing unit 53. If, conversely, the field prediction mode is set, the prediction mode switching circuit 52 causes the luminance blocks Y[1] and Y[2], from the four luminance blocks Y[1] to Y[4] supplied from the motion prediction circuit 50, to be constituted only by, for example, odd field line dots, while causing the remaining two luminance blocks Y[3] and Y[4] to be constituted by even field line dots, and outputs the resulting luminance blocks to the processing unit 53. In such case, the two luminance blocks Y[1] and Y[2] are associated with a motion vector, while the remaining two luminance blocks Y[3] and Y[4] are associated with the other motion vector.

The motion prediction circuit 50 outputs the sum of absolute values of the prediction errors in the frame prediction mode and the sum of absolute values of the prediction errors in the field prediction mode to the prediction mode switching circuit 52, which then compares the sums of absolute values of the prediction errors in the frame prediction mode and in the field prediction mode and performs processing corresponding to the prediction mode having a smaller sum value to output the resulting data to the processing unit 53.

Such processing may be performed in the motion prediction circuit 50. Specifically, the motion vector detection circuit 50 compares the sums of absolute values of the prediction errors in the frame prediction mode and in the field prediction mode and outputs a signal configuration corresponding to the mode with the smaller sum value to the prediction mode switching circuit 52, which then outputs the signal directly to the downstream side processing unit 53. In effect, this processing is performed by the motion vector detection circuit 50.

In the frame prediction mode, the chroma signal is sent to the processing unit 53 in such a state that odd field line data and even field line data exist together. In the case of the field prediction mode, upper half (four lines) of the chroma blocks Cb, Cr become chroma signals of the odd fields associated with the luminance blocks Y[1], Y[2], while lower half (four lines) of the chroma blocks Cb, Cr become chroma signals of the even fields associated with the luminance blocks Y[3], Y[4].

The motion vector detection circuit 50 generates the sum of absolute values of prediction errors for determining which of the intra-picture, forward, backward or bidirectional predictions should be used in the prediction decision circuit 54 in the following manner.

That is, as a sum of absolute value of the prediction error of intra-picture prediction, the difference between an absolute value $|\Sigma Aij|$ of the sum $\Sigma Aij$ of macro-block signals Aij of a reference picture and the sum $|\Sigma Aij|$ of the absolute values $|\Sigma Aij|$ of the macro-block signals Aij is found. Also, as a sum of absolute values of the prediction errors of forward prediction, a sum $|\Sigma Aij-Bij|$ of absolute value $|Aij-Bij|$ of the difference $Aij-Bij$ between the signal Aij of the macro-block of the reference picture and the signal Bij of the macro-block of the prediction picture is found. Similarly, the sum of absolute values of the prediction errors of the backward prediction and bidirectional prediction is found as in the case of the forward prediction provided that the prediction picture is changed to a prediction picture different from one used in froward prediction.

These sums of the absolute values are sent to the prediction decision circuit 54, which then selects the smallest one of the sums of the absolute values of the prediction errors of the forward prediction, backward prediction and bidirectional prediction as the sum of the absolute values of the prediction errors of the inter-frame prediction. This sum of the absolute values of the prediction errors of the inter-frame prediction is compared to the sum of the absolute values of the prediction errors of the intra-frame prediction and the smaller one of the sums is selected while the mode corresponding to the sum of the absolute values thus selected is selected as the prediction mode. That is, if the sum of the absolute values of the prediction errors of the intra-picture prediction is smaller, the intra-picture prediction mode is set, whereas, if the sum of the absolute values of the prediction errors of the inter-picture predication is smaller, the forward prediction mode, backward prediction mode or the bidirectional prediction mode, whichever has the smallest sum of the absolute values of the prediction errors, is set.

The motion vector detection circuit 50 operates similarly to the prediction decision circuit 54 for selecting one of the four prediction modes having the smallest of the sums of the absolute values of the prediction errors, and for outputting the motion vector corresponding to the selected mode.

Thus the motion vector detection circuit 50 sends a macro-block signal of the reference picture via prediction mode switching circuit 52 to the processing unit 53 in a signal configuration corresponding to the frame prediction mode or the field prediction mode as selected by the prediction mode stitching circuit 52. In addition, the motion vector detection circuit 50 detects the motion vector between the reference picture and the prediction picture corresponding to one of the four prediction modes that has been selected by the prediction decision circuit 54 to output the detected motion vector to a variable length encoding circuit 58 and to a motion compensation circuit 64. As motion vector, one that gives the smallest value of the sums of the absolute values of the prediction errors is selected, as described above.

When the motion vector detection circuit 50 is reading out picture data of the I-picture from the forward original picture unit 51a, the prediction decision circuit 54 sets the intra-frame (intra-picture) prediction mode (mode not performing motion compensation) as the-prediction mode, and sets a switch 53d of the processing unit 53 to a side of a contact a. This allows the I-picture data to be supplied to a DCT mode switching circuit 55.

The DCT mode switching circuit 55 sets the data of four luminance block data to such a state in which odd-field lines and even-field lines co-sexist (frame DCT mode) or to a state in which odd-field lines and even-field lines are separated from each other (field DCT mode) and outputs the resulting data to the DCT circuit 56.

That is, the DCT mode switching circuit 55 compares the encoding efficiency when DCT is done on the odd-field data and the even-field data existing together to that when DCT is done on the odd-field data and the even-field data separated from each other and selects the mode having the higher encoding efficiency.

For example, the input signal is set to such a state in which the odd-field data and the even-field data exist together, and the difference between the signals of the odd-field lines and those of the even-field lines vertically neighboring to one another is found. The sum of the absolute values or square sum is also found. In addition, the input signal is set to such a state in which the odd-field data and the even-field data are separated from each other, and the differences between the signals of the vertically neighboring odd-field lines and the differences between the signals of the vertically neighboring even-field lines are calculated, while the sums of the absolute values or the square sums of the respective differences are found. The two sum values are also compared to one another for setting the DCT mode corresponding to the smaller sum value. If the former sum is smaller, the frame DCT mode is set, whereas, if the latter sum is smaller, the field DCT mode is set.

The data having the configuration corresponding to the selected DCT mode is outputted to the DCT circuit 56, while a DCT flag specifying the selected DCT mode is outputted to the variable length encoding circuit 58 and to the motion compensation circuit 64. Also, data from the DCT mode switching circuit 55 (signal S1) is sent to the adder 70 for taking out the difference values.

As will become apparent from comparison of the prediction mode in the prediction mode switching circuit 52 and the DCT mode in the DCT mode switching circuit 55, the data configurations of the two modes are substantially the same insofar as the luminance block is concerned.

Also, if the frame prediction mode (mode in which odd lines and even lines co-exist) is selected in the prediction mode switching circuit 52, the probability is high that the frame DCT mode (mode in which odd lines and even lines co-exist) be selected in the DCT mode switching circuit 55. Similarly, if the field prediction mode (mode in which odd lines and even lines are separated from each other) is selected in the prediction mode switching circuit 52, the probability is high that the field DCT mode (mode in which odd lines and even lines are separated from each other) be selected in the DCT mode switching circuit 55.

However, this is not necessary so at all times and, in the prediction mode switching circuit 52, the mode is selected so that the sum of absolute values of the prediction errors will become smaller, whereas, in the DCT mode switching circuit 55, the encoding efficiency will become better.

The I-picture data outputted by the DCT mode switching circuit 55 is fed to the DCT circuit 56 for DCT processing for being converted into DCT coefficients. These DCT coefficients are fed to the quantization circuit 57 so as to be quantized with a predetermined quantization step (a quantization scale). The resulting quantized data is fed to the VLC circuit 58. In the present embodiment, the DCT coefficients are quantized with the quantization scale of 1 as mentioned below.

The VLC circuit 58 converts the picture data (herein data of an I-picture) supplied from the quantization circuit 57 into a variable length code, for example, Huffman code, and outputs the resulting data to the transmission buffer 59.

The VLC circuit 58 is fed with the quantization step (quantization scale) from the quantization circuit 57 and with the prediction mode (mode specifying which of the intra-picture prediction, forward prediction, backward prediction or bidirectional prediction has been set) from the prediction decision circuit 54. The VLC circuit 58 is also fed with the motion vector from the motion vector detection circuit 50 and with the prediction flag (flag specifying which of the frame prediction mode or the field prediction mode has been set). The VLC circuit 58 is additionally fed with a DCT flag (flag specifying which of the frame DT mode flag or the field DT mode flag has been set).

The transmission buffer 59 transiently stores the input data and the data stored in the transmission buffer 59 is read out at a pre-set timing and outputted as transmission data. The transmission data is then supplied to a transmission channel 74 so as to be transmitted to the receiving side via transmission channel 74 or recorded on the recording medium 75.

The I-picture data outputted by the quantization circuit 57 is supplied to the dequantization circuit 60 so as to be dequantized in accordance with the quantization step supplied from the quantization circuit 57. An output of the dequantization circuit 60 is fed to an inverse DCT circuit 61 for inverse DCT and thence supplied via an adder 72 and a DCT block re-arraying circuit 66 to an adder 62. An output of the adder 62 is supplied to a frame memory 63 for storage in a forward prediction picture unit 63a. An output of the IDCT circuit 61 (signal S2) is sent to the subtractor 70 where a difference between the output of the IDCT circuit 61 (signal S2) and the output of the DCT mode switching circuit 55 (signal S1) is found as difference data which is routed to the VLC circuit 71. This difference data is also supplied to the adder 72, as will be explained in detail subsequently.

When processing picture data of the sequentially entered respective frames as, for example, I, B, P, B, P, B and so forth, the motion vector detection circuit 50 processes the first-supplied frame picture data as I-picture and then, before processing the next input frame picture as B-picture, processes the next succeeding frame picture data as P-picture. It is because the B-picture necessitates backward prediction and hence decoding cannot be done unless a P-picture as the backward prediction picture is provided in advance.

Thus the motion vector detection circuit 50 starts, next to the processing of the I-picture, the processing of picture data of the P-picture stored in the backward original picture unit 51c. The sum of the absolute values of the macro-block based frame-to-frame differences (prediction errors) is supplied, in a manner as described above, from the motion vector detection circuit 50 to the prediction mode switching circuit 52 and to the prediction decision circuit 54. The prediction mode switching circuit 52 is responsive to the sum of absolute values of the prediction errors of the macro-blocks of the P-picture to set the prediction mode to intra-picture prediction, forward prediction, backward prediction or bidirectional prediction mode.

If the intra-picture prediction mode is set, the processing unit 53 sets the switch 53d to a contact a as described above. Thus, similarly to the I-picture data, the P-picture data is outputted via DCT mode switching circuit 55, DCT circuit 56, quantization circuit 57, VLC circuit 58 and transmission buffer 59. The P-picture data is also fed via dequantization circuit 57, IDCT circuit 61, adder 72, DCT block re-arraying circuit 66 and adder 62 to the frame memory 63 for storage in a backward prediction picture unit 63b.

When the forward prediction mode is set, the switch 53d is set to a contact b, at the same time as data of a picture stored in the forward prediction picture unit 63a of the frame memory 63, herein the I-picture, is read out. The read-out picture data is motion-compensated by the motion compensation circuit 64 in congruity with the motion vector outputted by the motion vector detection circuit 50. That is, when the setting for the forward prediction mode is commanded from the prediction decision circuit 54, the motion compensation circuit 64 shifts the read-out address of the forward prediction picture unit 63a in an amount corresponding to the motion vector from an address position corresponding to the position of the macro-block currently read out by the motion vector detection circuit 50 for generating prediction picture data.

The prediction picture data, outputted by the motion compensation circuit 64, is sent to the subtractor 53a. The subtractor 53a subtracts the prediction picture data corresponding to the macro-block supplied from the motion compensation circuit 64 from the data of the macro-block of the reference picture supplied from the prediction mode switching circuit 52 to output the difference (prediction error). The difference data is outputted via DCT mode switching circuit 55, DCT circuit 56, quantization circuit 57, VLC circuit 58 and retransmission buffer 59. Also the difference data is locally decoded by the dequantization circuit 60 and IDCT circuit 61 and thence supplied via adder 72 and DCT block re-arraying circuit 66 to the adder 62.

The adder 62 is also fed with the same data as the prediction picture data supplied to the subtractor 53a. The adder 62 sums the prediction picture data outputted by the motion compensation circuit 64 to the difference data outputted by the IDCT circuit 61. This gives picture data of the original decoded picture data of the P-picture. The picture data of the P-picture is supplied to the frame memory 63 for storage in the backward prediction picture unit 63b.

After the data of the I- picture and the P-picture have been stored in this manner in the forward prediction picture unit 63a and in the backward prediction picture unit 63b, the motion vector detection circuit 50 executes processing of the B-picture. The prediction mode switching circuit 52 sets the frame/field mode, in congruity with the size of the sum of the absolute values of the macro-block based frame-to-frame difference, while the prediction decision circuit 54 sets the prediction mode to one of the intra-picture prediction, forward prediction, backward prediction or the bidirectional prediction modes.

For the intra-picture prediction mode or the forward prediction mode, the switch 53d is set to the contact a or contact b, as mentioned previously. At this time, processing similar to that for the P-picture is performed for transmitting data.

If conversely the prediction mode is set to the backward prediction mode or to the bidirectional prediction mode, the switch 53d is set to its contact c or contact d.

For the backward prediction mode in which the switch 53d is set to its contact c, the picture stored in the backward prediction picture unit 63b, herein the picture of the P-picture, is read out. The picture data, thus read out, is motion-compensated by the motion compensation circuit 64 in congruity with the motion vector outputted by the motion vector detection circuit 50. That is, if the setting for the backward prediction mode is commanded by the prediction decision circuit 54, the motion compensation circuit 64 shifts the readout address of the backward prediction picture unit 63b in an amount corresponding to the motion vector from an address position corresponding to the position of the macro-block currently outputted by the motion vector detection circuit 50 to read out data to generate prediction picture data.

The prediction picture data outputted by the motion compensation circuit 64 is sent to a subtractor 53b which then subtracts the prediction picture data supplied from the motion compensation circuit 64 from the data of the macro-block of the reference picture supplied by the prediction mode switching circuit 52 to output the difference as difference data. The difference data is outputted via DCT mode switching circuit 55, DCT circuit 56, quantization circuit 57, VLC circuit 58 and transmission buffer 59.

For the bidirectional prediction mode, in which the switch 53d is set to its contact d, the picture stored in the forward prediction unit 63a, herein the I-picture, and the picture stored in the backward prediction unit 63b, herein the P-picture, are read out. These picture data are motion-compensated by the motion compensation circuit 64 in congruity with the motion vector outputted by the motion vector detection circuit 50. That is, when the setting for the bidirectional prediction mode is commanded from the prediction decision circuit 54, the motion compensation circuit 64 shifts the readout addresses of the forward prediction picture unit 63a and the backward prediction unit 63b in an amount corresponding to two motion vectors (that is, a motion vector for the forward prediction picture and a motion vector for the backward prediction picture), from an address position corresponding to the position of the macro-block currently read out by the motion vector detection circuit 50, in order to read out data for generating prediction picture data.

The prediction picture data outputted by the motion compensation circuit 64 is supplied to a subtractor 53c which then subtracts an average value of the prediction picture data supplied from the motion compensation circuit 64 from the data of the macro-block of the reference picture supplied from the motion vector detection circuit 50 to output the difference as difference data. The difference data is outputted via DCT mode switching circuit 55, DCT circuit 56, quantization circuit 57, VLC circuit 58 and transmission buffer 59.

Since the picture of the B-picture is not used as a prediction picture for other pictures, it is not stored in the frame memory 63.

Meanwhile, in the frame memory 63, the forward prediction picture unit 63a is switched to the backward prediction picture unit 63b or vice versa by bank switching so that data stored n one or the other of these units 63a, 63b will be selectively outputted as a forward prediction picture or as a backward prediction picture to a pre-set reference picture.

Although the foregoing description has been made mainly on the luminance block, the chroma block is similarly processed with a macro-block as a unit and transmitted. The motion vector for processing the chroma block is the motion vector of the associated luminance block halved in both the vertical and horizontal directions.

The structure and operation for taking out an error during DCT processing, which is the main point of the embodiment of the present invention, will be explained in detail.

The structure for this includes the above-mentioned subtractor 70, adder 72, VLC circuit 71 and the transmission buffer 73.

The picture signal (in case of an I-picture) and the difference signal (in case of B- and P-pictures) outputted by the frame/field DCT mode switching circuit 55 are outputted to the DCT circuit 56 and the adder 70. The input signal to the DCT circuit 56 is processed by DCT processing as conventionally.

The DCT processed signal from the DCT circuit 56 is supplied to the quantization circuit 57. That is, the quantization circuit 57 directly outputs the input signal without doing any processing. The output signal from the quantization circuit 57 is supplied to the variable length encoding circuit 58 and the dequantization circuit 60. Similarly, the dequantization circuit 60 performs dequantization with the quantization scale of 1.

The signal S2 outputted by the IDCT circuit 61 is outputted to the subtractor 70 and the adder 72. The subtractor 70 finds a difference D3 between the signal S1 from the frame/field DCT mode switching circuit 55 and the signal S2 from the IDCT circuit 61. That is, the subtractor 70 executes the following processing:

$$S3 = S1 - S2$$

and sends the result to the VLC circuit 71 and to the adder 72.

The VLC circuit 71 variably-length encodes the difference signal S3 from the adder 70 and outputs the output bitstream (difference bitstream) via transmission buffer 73. The output data of the transmission buffer 73 is then sent to, for example, a transmission channel 74 via which it s sent to the receiving side. Alternatively, the data is recorded via recording/transmission system on a recording medium 75.

The adder 72 sums the signal S2 from the IDCT circuit 61 to the signal S3 from the adder 70 to give a signal S4 which is outputted to the adder 62.

The principle of realizing reversible encoding by the present picture signal encoding apparatus is explained. The signal S1 is a crude signal not processed with DCT nor with quantization. That is, the signal S1 retains the information of the original picture in its entirety. If the signal is processed with DCT, part of the information of the original signal is lost even if quantization is not performed, that is if quantization is done with the quantization scale equal to 1. It is because the DCT processing is a real-number processing, whereas the DCT circuit and the IDCT circuit abort the processing with a finite word length.

Thus, for realizing reversible encoding, the information lost by DCT processing needs to be transmitted separately.

By DCT and IDCT operations, part of the information is lost in the output signal S2 of the IDCT circuit 61. The subtractor 70 finds a difference between the signals S1 and S2 to extract the information lost by the DCT processing. This information is the signal S3. The original signal S1 can be restored by adding the signal S3 to the signal S2 by the adder 72.

Figure 2:
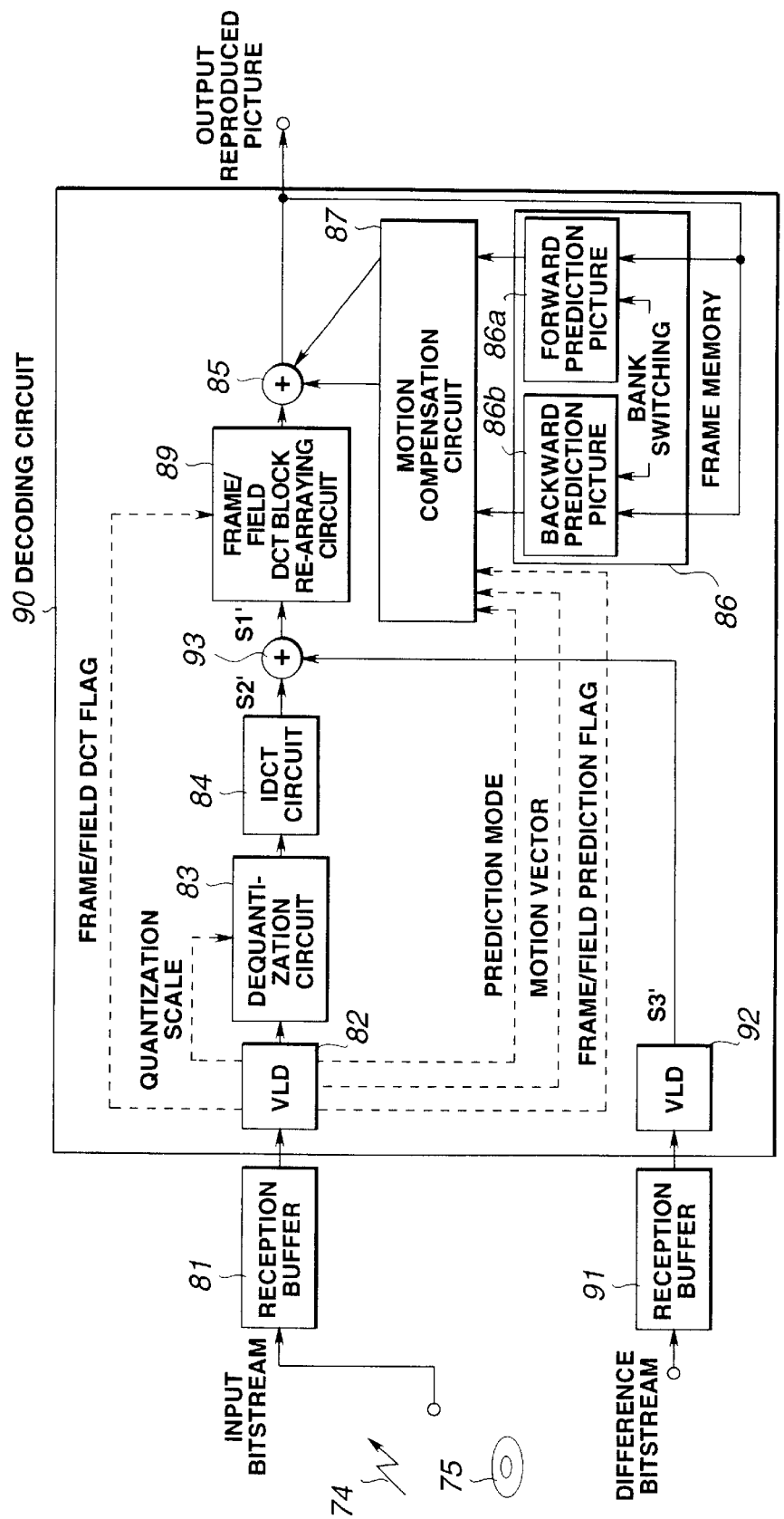
FIG. 2 is a block diagram showing the structure of a picture signal decoding apparatus according to a first embodiment of the represent invention.

Next, a picture signal decoding apparatus for decoding the signal obtained by the picture signal encoding apparatus shown in FIG. 1 is explained to referring to FIG. 2.

In this figure, encoded picture data outputted by the encoding apparatus shown in FIG. 1 and transmitted over the transmission channel 74, or encoded picture data recorded on the recording medium 75, are received by a receiving circuit, not shown, or reproduced by a reproducing apparatus, so as to be transiently stored in a reception buffer 81 and thence supplied to a variable length decoding circuit 82 of a decoding circuit 90. The variable length decoding circuit 82 variable-length decodes the data supplied from the reception buffer 81 and outputs the motion vector, prediction mode, prediction flag and the DCT flag to a motion compensation circuit 87, while outputting the quantization step to a dequantization circuit 83 and outputting the decoded picture data to the dequantization circuit 83.

The dequantization circuit 83 dequantizes the picture data supplied from the variable length decoding circuit 82 in accordance with the quantization step (in this case, the quantization scale of 1) similarly supplied from the variable length decoding circuit 82 to output the dequantized data to an IDCT circuit 84. An output data of the dequantization circuit 83 (DCT coefficients) are inverse DCTed by the IDCT circuit 84 so as to be supplied via adder 93 and DCT block re-arraying circuit 89 to an adder 85. The adder 93 is used for adding an error produced due to word length limitation at the time of the above-described DCT processing, as will be explained subsequently in detail.

If the picture data supplied from the IDCT circuit 84 is I-picture data, such data is outputted from an adder 85 and supplied to a frame memory 86 for storage in the forward prediction picture unit 86a for generating prediction picture data for picture data inputted later to an adder 85 (P- or B-picture data). Output data from the adder 85 is outputted as output playback picture so as to be outputted to a downstream side circuit, such as a format converting circuit, not shown.

If the picture data supplied from the IDCT circuit 84 is data of a P-picture having picture data of a directly previous frame as prediction picture data and is data of the forward prediction mode, picture data of the previous frame stored in the forward prediction picture unit 86a of the frame memory 86 (I-picture data) is read out. The picture data thus read out is motion-compensated by the motion compensation circuit 87 in meeting with the motion vector outputted by the variable length decoding circuit 82. The adder 85 adds the motion-compensated picture data and picture data supplied from the IDCT circuit 84 (difference data) and the resulting sum data is outputted as a reproduced output picture. The sum data, that is decoded P-picture data, is sent to the frame memory 86 for storage in the backward prediction picture unit 86b for generating prediction picture data for picture data inputted later to the adder 85 (B- or P-picture data).

The data which is P-picture data but is of the intra-picture prediction mode, similarly to the I-picture data, is not processed particularly in the adder 85, but is directly stored in the backward prediction picture unit 86b.

Since this P-picture is a picture to be displayed next to the next B-picture, it is not outputted at this stage to the format converting circuit, not shown. The P-picture inputted subsequently to the B-picture is processed and transmitted before the B-picture.

If the picture data supplied from the IDCT circuit 84 is B-picture data, I-picture data storied in the forward prediction picture unit 86a of the frame memory 86, P-picture data stored in the backward prediction picture unit 86b of the frame memory 86 and both picture data are read out in meeting with the prediction mode supplied from the variable length decoding circuit 82 for the forward prediction mode, backward prediction mode and for the bidirectional prediction mode, respectively. The picture data, thus read out, is compensated by the motion compensation circuit 87 in congruity with the motion vector outputted by the variable length decoding circuit 82 for generating a prediction picture. However, no prediction picture is generated if motion compensation is not required (that is, in intra-picture prediction mode).

The data motion-compensated in the motion compensation circuit 87 is summed by the adder 85 to an output of the IDCT circuit 84. This sum output is outputted later to the format converting circuit, not shown.

This sum output is B-picture data and is not used for generating a prediction picture for other pictures, so that it is not stored in the frame memory 86.

After outputting of the B-picture, picture data of the P-picture stored in the backward prediction picture unit 86b is read out and sent to the adder 85 via motion compensation circuit 87. However, motion compensation is not executed at this time.

Although the circuit corresponding to the prediction mode switching circuit 52 and the DCT mode switching circuit 55 in the encoder of FIG. 1 are not shown in the decoder 31, the processing to be preformed by these circuits, that is the processing for restoring the configuration in which odd field signals are separated from the even field signals to the configuration in which odd field signals exist with the even field signals, is executed by the motion compensation circuit 87.

Although the foregoing description has been made mainly on the luminance block, the chroma block is similarly processed. In this case, the motion vector for processing the chroma block is the motion vector of the associated luminance block halved in both the vertical and horizontal directions.

The difference bitstream variable-length encoded by the VLC circuit 71 of FIG. 1 and taken out by the transmission buffer 73 is transmitted over the transmission channel 74 or reproduced from the recording medium 75 so as to be supplied to a reception buffer 91 of FIG. 2. A variable length decoding circuit 92 reads out a corrected bitstream from the reception buffer to decode the variable length code of the bitstream. The variable length decoding circuit 92 is a counterpart device of the variable length encoding circuit 71 in the above-described picture signal encoding apparatus and performs an operation reversed from that of the variable length encoding circuit 71.

An output signal S3' of the variable length decoding circuit 92 coincides with the signal S3 in the encoding apparatus, while an output signal S2' of the IDCT circuit 84 coincides with the signal S2 in the above-described encoding apparatus.

The adder 93 adds the output signal S3' of the variable length decoding circuit 92 to the output signal S2' of the IDCT circuit 84 to output a signal S1' which is equivalent to the signal S1 of the encoding apparatus.

The above enables the reversible encoding to be performed by the picture signal encoding/decoding apparatus employing DCT processing.

The configuration of the picture signal encoding apparatus according to a second embodiment and the configuration of the picture signal decoding apparatus associated with the picture signal encoding apparatus of the second embodiment of the present invention will now be explained by referring to FIGS. 3 and 4, respectively.

Figure 3:
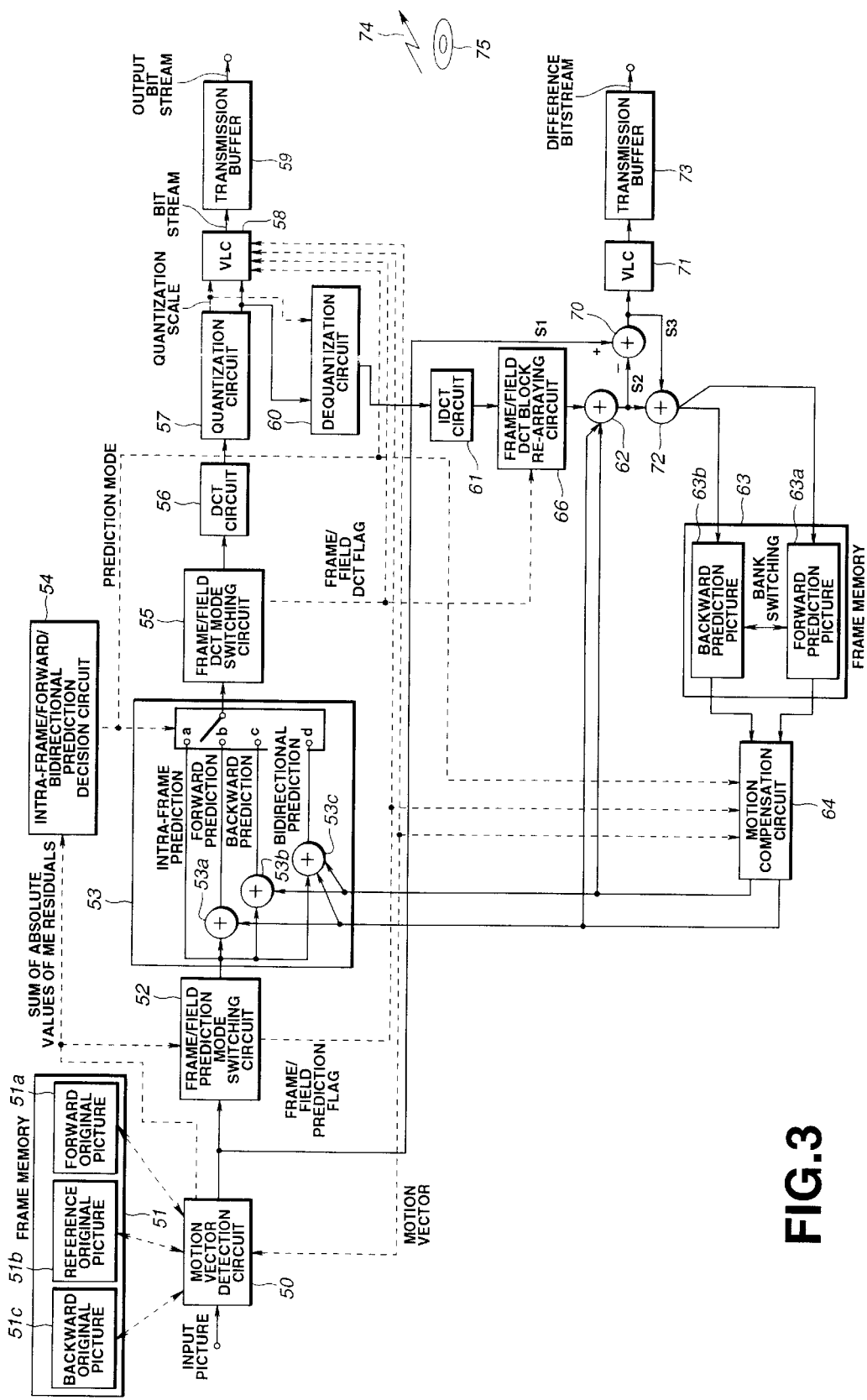
FIG. 3 is a block diagram showing the structure of a picture signal encoding apparatus according to a second embodiment of the present invention.

FIG. 3 shows the picture signal encoding apparatus of the second embodiment of the present invention.

The picture signal encoding apparatus shown in FIG. 3 is similar to the picture signal encoding apparatus shown in FIG. 1 except the operation of the subtractor 70, adder 72 and the VLC circuit 71 and hence the description of the common portions is omitted for simplicity.

The motion vector detection circuit 50 of FIG. 3 outputs its output signal S1 to the frame/field prediction mode switching circuit 52 and to the adder 70. An input signal to the frame/field prediction mode switching circuit 52 is processed in the same way as in the embodiment shown in FIG. 1.

The quantization circuit 57 executes quantization with the quantization scale equal to 1. That is, the quantization circuit 57 directly outputs its input signal without any signal processing. The output signal from the quantization circuit 57 is then supplied to the variable length encoding circuit 58 and the dequantization circuit 60. Similarly, the dequantization circuit 57 executes dequantization with the quantization scale equal to 1.

The signal outputted by the adder 62 is outputted to the subtractor 70 and to the adder 72. The subtractor 70 computes a difference D3 between the signal S1 from the motion vector detection circuit 50 and the signal S2 from the adder 62. That is, the subtractor 70 performs the following operation:

$$S3 = S1 - S2$$

and outputs the result to the VLC circuit 71 and the adder 72.

The VLC circuit 71 sums the signal S2 from the adder 62 to the signal S3 from the subtractor 70 to output the sum signal.

The principle of realizing reversible encoding by the present picture signal encoding apparatus is now explained.

The signal S1 is a crude signal not processed with DCT nor with quantization. That is, the signal St retains the information of the original picture in its entirety. If the signal is processed with DCT, part of the information of the original signal is lost even if quantization is not performed, that is if quantization is done with the quantization scale equal to 1. It is because the DCT processing is a real-number processing, but the DCT circuit and the IDCT circuit abort the processing with a finite word length.

Thus, for realizing reversible encoding, the information lost by DCT processing needs to be transmitted separately.

By DCT and IDCT operations, part of the information is lost in the output signal S2 of the IDCT circuit 61. The subtractor 70 finds a difference between the signals S1 and S2 to extract the information lost by the DCT processing. This information is the signal S3.

The original signal S1 can be restored by adding the signal S3 to the signal S2 by the adder 72.

The operation of the picture signal processing apparatus is otherwise the same as that of the picture signal processing apparatus shown in FIG. 1.

Figure 4:
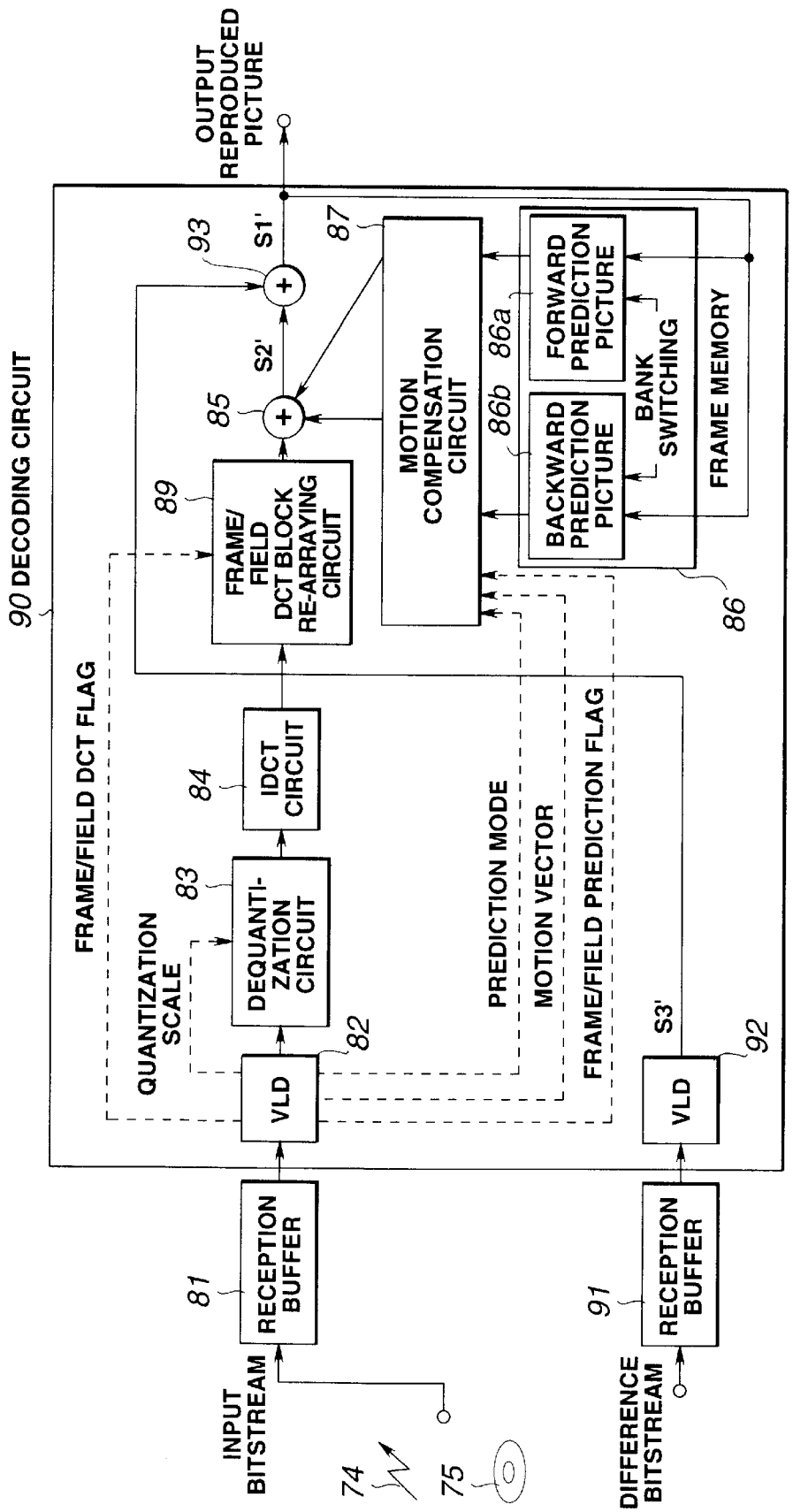
FIG. 4 is a block diagram showing the structure of a picture signal decoding apparatus according to a second embodiment of the present invention.

FIG. 4 shows a picture signal decoding apparatus as a counterpart of the picture signal processing apparatus of the second embodiment shown in FIG. 2.

The picture signal decoding apparatus shown in this figure is similar to the apparatus shown in FIG. 2 except the transmission buffer 91, variable length decoding circuit 92 and the adder 93. Therefore, the description for the common portions is not made for simplicity.

The corrected bitstream, variable-length encoded in the VLC circuit 71 of the picture signal processing apparatus, is transmitted from the transmission channel or reproduced from the recording medium so as to be inputted to the reception buffer 91. The variable length decoding circuit 92 reads out the corrected bitstream from the reception buffer and decodes its variable length code. The variable length decoding circuit 92 is a counterpart of the VLC circuit 71 of the picture signal processing apparatus and performs an operation which is the reverse of the operation of the VLC circuit.

The output signal S3' of the variable length decoding circuit 92 coincides with the signal S3 in the picture signal processing apparatus while the output signal S2' coincides with the signal S2 in the encoding apparatus. The adder 93 adds the output S3' of the variable length decoding circuit 92 to the signal S2' of the adder 85 to output an output signal S1 which is equivalent to S1 of the picture signal processing apparatus.

The above configuration of FIGS. 3 and 4 enables reversible encoding in the picture signal encoding/decoding apparatus employing DCT processing.

Figure 5:
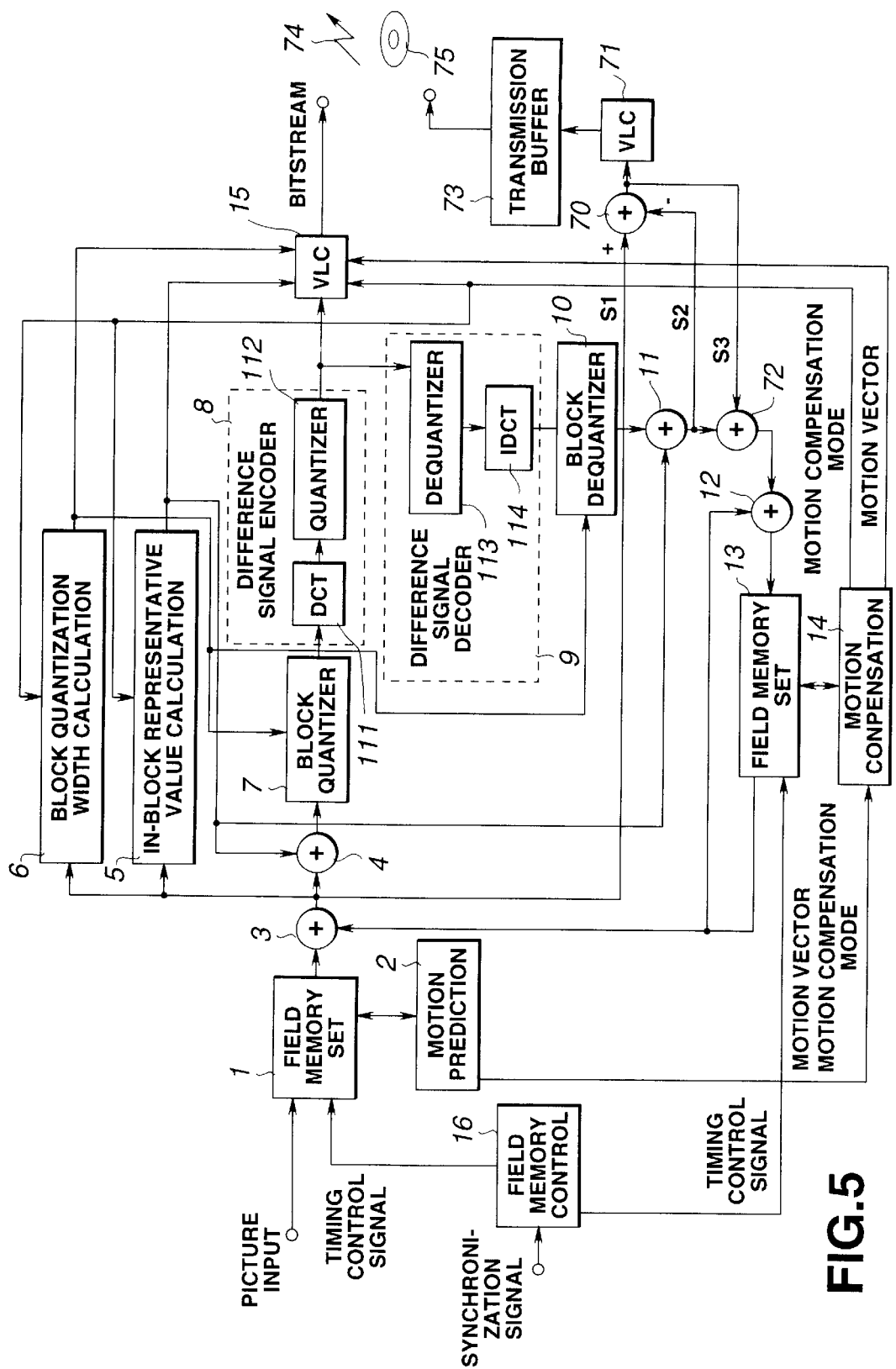
FIG. 5 is a block diagram showing the structure of a picture signal encoding apparatus according to a third embodiment of the present invention.
Figure 6:
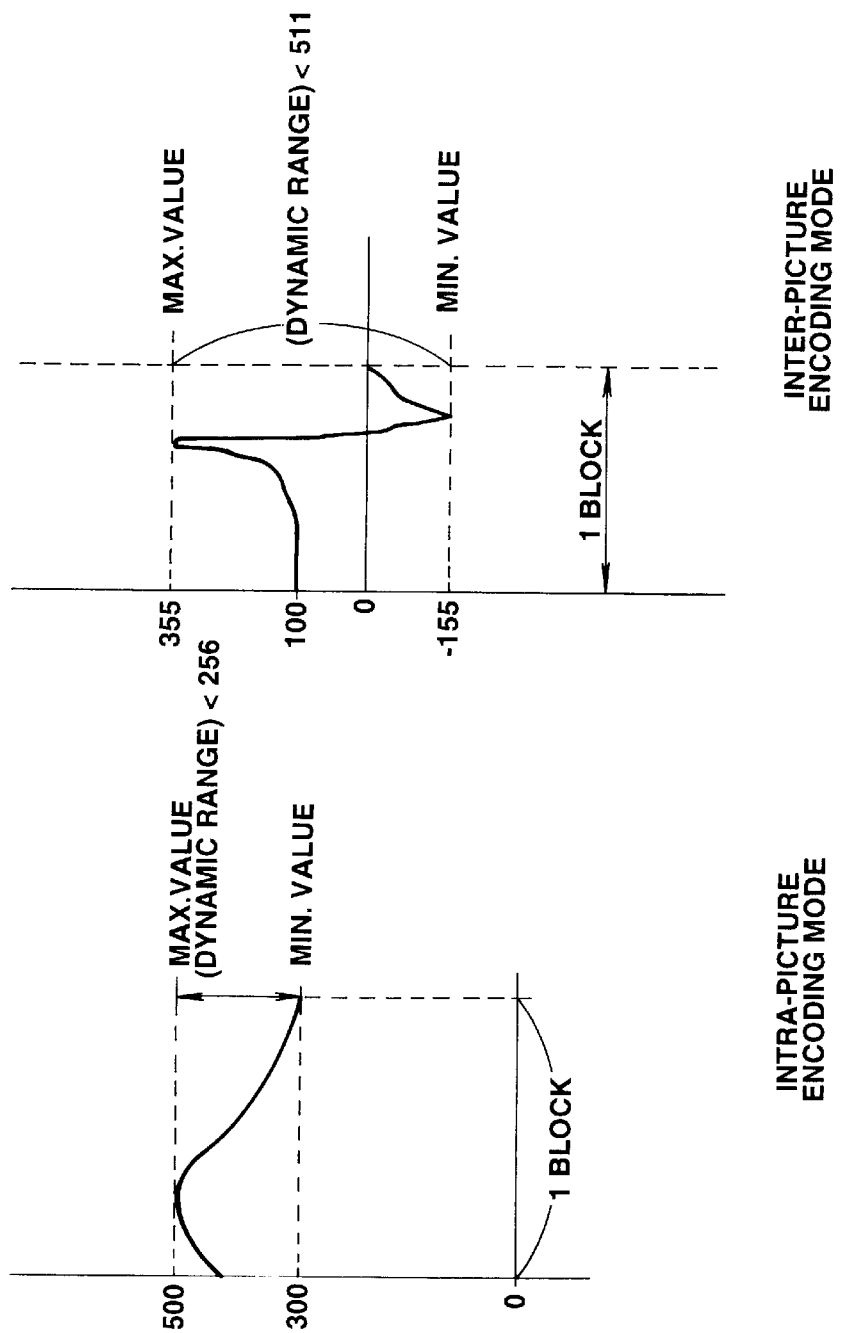
FIGS. 6A and 6B illustrate an example of the dynamic range of a picture data block.
Figure 7:
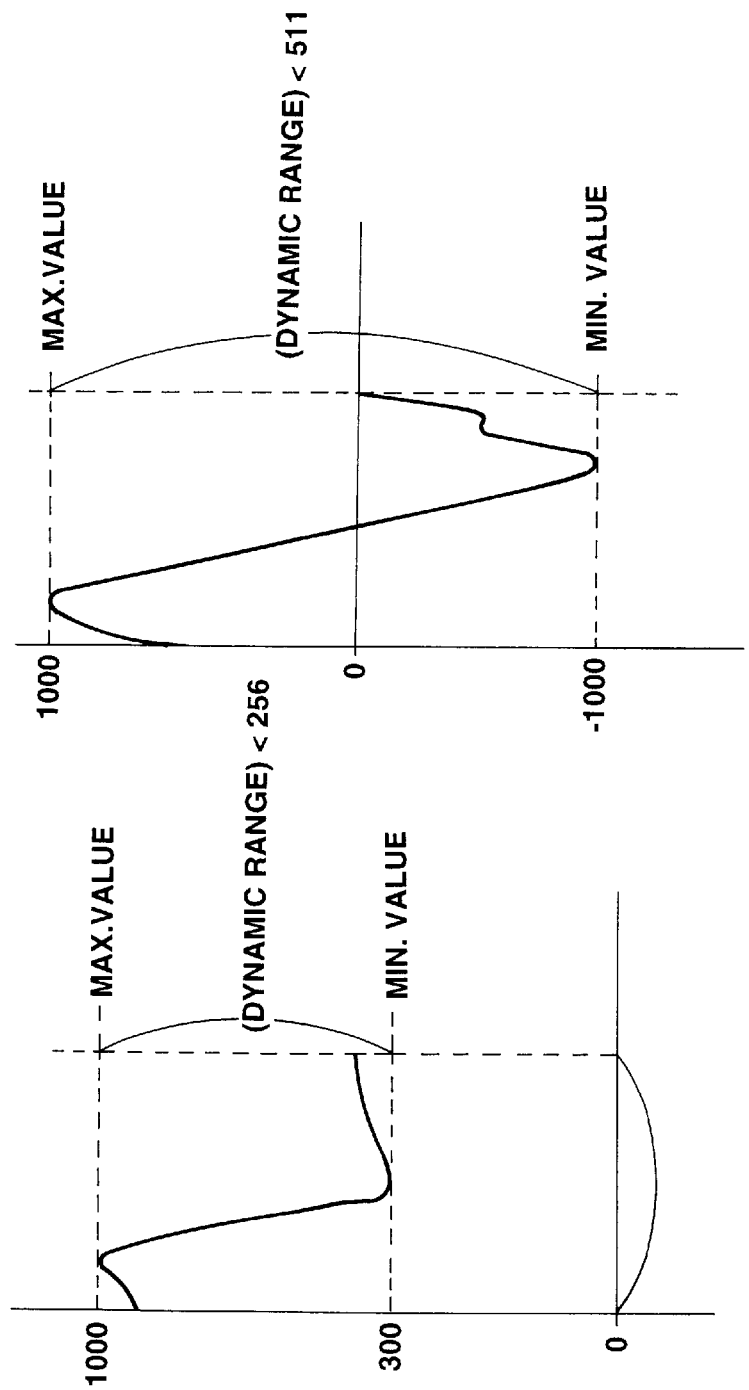
FIGS. 7A and 7B illustrate another example of the dynamic range of a picture data block.

The configuration of a picture signal processing apparatus according to a third embodiment of the present invention is now explained by referring to FIGS. 5 to 7.

In the third embodiment, representative value data of picture data of m bits, such as 10 bits, and the quantization width, are determined per pre-set block, and the difference of the above picture data from the representative value data is found. This difference data is quantized based on the quantization width for generating first quantized data. The first quantized data is processed with preset transform for generating transform coefficients which then are quantized for generating second quantized data. The representative value data, quantization width and the second quantized data are encoded. In the first quantization, the representative value is designed to be at a mid point of the quantization width for reducing the quantization error. Moreover, motion compensation of an m-bit picture, such as a 10-bit picture, is carried out by n bits, such as 8 bits, for reducing the memory size. This is equivalent to sending lower bits, for which motion prediction is not applied, by intra-picture coding. In addition, by adaptively switching between reversible encoding and irreversible encoding at the time of encoding m bits, such as 10-bits, for enabling reversible compression of high-definition pictures. Moreover, second quantization can be performed based on the quantization width in the first quantization for producing a picture of uniform picture quality.

FIG. 5 shows, in a block diagram, a picture signal encoding apparatus according to a third embodiment of the present invention.

In the picture signal encoding apparatus shown in FIG. 5, it is assumed for explanation that picture data of higher definition than 8-bits, such as 10-bit picture data, is inputted to the apparatus. Although the present embodiment is directed to an example for a 10-bit picture signal, the present invention s similarly applicable to a picture signal having a definition higher than 10 bits.

A set of field memories 1 is configured for storing 10-bit precision picture data. For example, the field memory set 1 transiently stores digital picture data (picture pixel data) grouped into 16×16 pixel blocks, and outputs blocks of 10-bit precision to an adder 3 based on a timing signal generated by a field memory controller 16 in congruity with the synchronization signal for the input picture.

A motion prediction circuit 2 sets a motion compensation mode (one of the intra-picture mode, backward prediction mode or the bidirectional prediction mode) for a block of the picture data as a reference picture stored in the field memory set 1, and sets the motion vector between the reference picture and the prediction picture corresponding to the set mode, in order to output the detected motion vector to a motion compensation circuit 14 and to a VLC circuit 15. In addition, the motion prediction circuit 2 sends the motion compensation mode not only to the motion compensation circuit 14 and to the VLC circuit 15 but also to an in-block representative value computing circuit 5 and to a block quantization width computing circuit 6 via motion compensation circuit 14.

Meanwhile, the motion prediction circuit 2 is configured similarly to the corresponding circuit in FIG. 1 so that 8-bit precision picture data can be inputted to the motion prediction circuit 2 and hence all connection lines from the field memory set 1 cannot be connected to the circuit 2.

Thus, of the connection lines for 10-bit precision picture data from the field memory set 1, those excluding the connection lines for lower 2 bits are connected to the motion prediction circuit 2.

That is, from the 10-bit precision picture data, 8-bit precision picture data obtained by discarding lower 2 bits are inputted to the motion prediction circuit 2.

When the block of 10-bit precision picture data, as a reference picture stored in the field memory set 1, are read out therefrom and sent to the adder 3, a prediction picture corresponding to the motion compensation mode as set by the motion prediction circuit 2 is sent from the motion compensation circuit 14 via field memory set 13 to the adder 3.

In the adder 3, the subtracting operation corresponding to the motion compensation mode is performed as described above. That is, if the motion compensation mode is the intra-picture prediction mode, the picture data block with the 10 bit precision is directly outputted from the field memory set 1, whereas, if the motion compensation mode is inter-picture prediction mode, that is the forward prediction mode, backward prediction mode or the bidirectional prediction mode, the difference between the picture data block with the 10 bit precision from the field memory set 1 and the prediction picture from the motion compensation circuit 14 is found. The 10-bit precision output is sent as signal S1 to an adder 4, in-block representative value computing circuit 5 and to the subtractor 70.

The in-block representative value computing circuit (representative value computing circuit) 5 computes representative value data of sum outputs of the adder 3, in meeting with the motion compensation mode sent from the motion prediction circuit 2 via motion compensation circuit 14, and outputs the computed data to the subtractor 4. The block quantization width computing circuit 6 computes the quantization width Q used for quantizing the sum output of the adder 3 by a block quantizer 7 in meeting with the motion compensation mode supplied via motion compensation circuit 14 from the motion prediction circuit 2, as later explained, and outputs the resulting quantization width Q to the block quantizer 7 and to a dequantizer 10.

Figure 8:
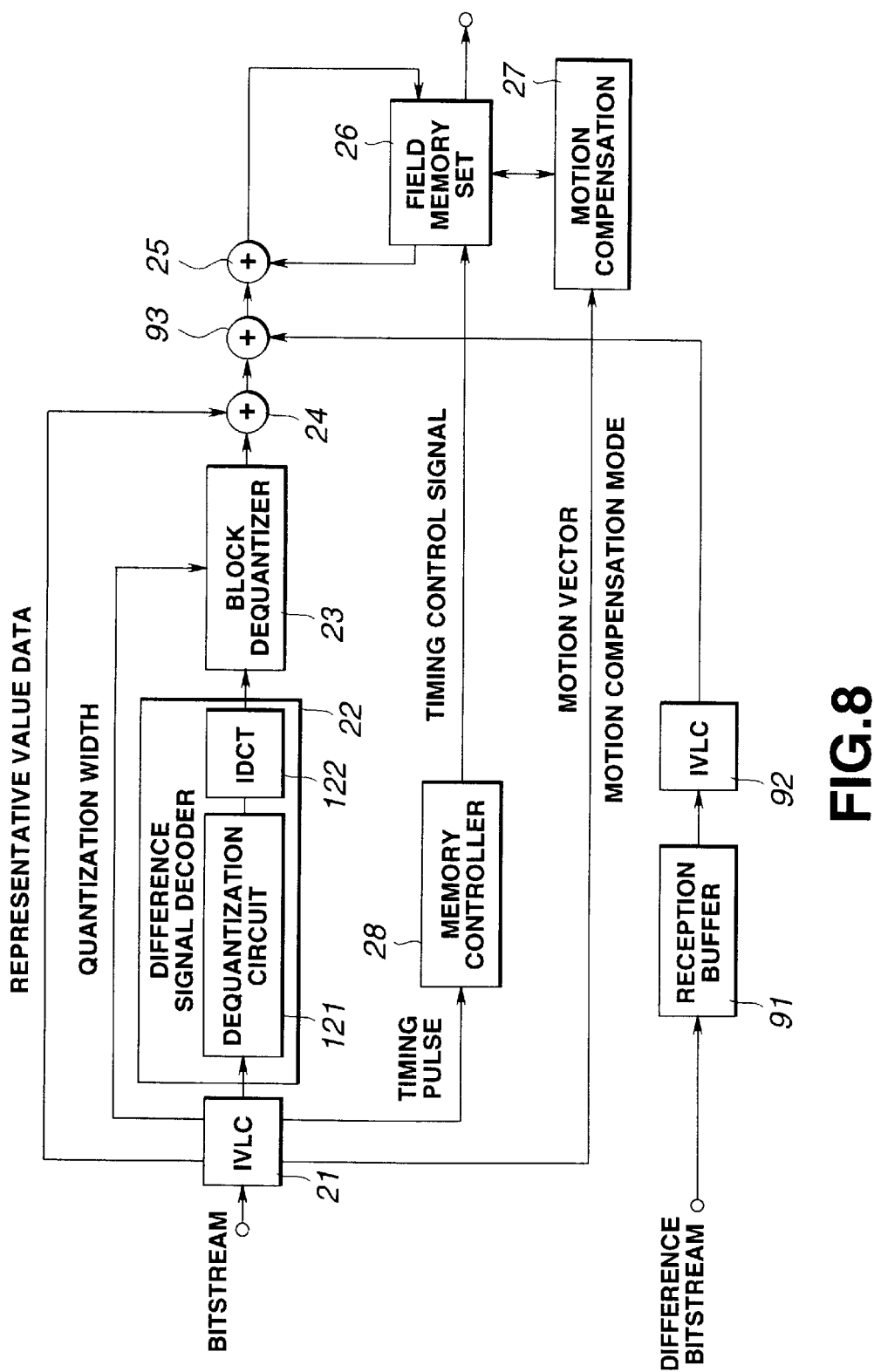
FIG. 8 is a block diagram showing the structure of a picture signal decoding apparatus according to a third embodiment of the present invention.

The quantization width as determined by the quantization width computing circuit 65 and the quantization width in a difference signal encoder 8, a difference signal decoder 9 and a difference signal decoder 22 in FIG. 8, are denoted herein as quantization widths Q and S, respectively.

The subtractor 4 finds a difference between an output of the adder 3 and the representative value data outputted by the representative value computing circuit 5, and the resulting difference data is outputted to the block quantizer 7. In the block quantizer 7, the sum output of the subtractor 4 is quantized with the quantization width Q, that is divided by the quantization width Q, and the resulting data is outputted to the difference signal encoder 8.

The difference signal encoder 8 is made up of a DCT circuit 111 and a quantizer 112. The DCT circuit 111 processes the quantized data from the block quantizer 7 with DCT for conversion into DCT coefficients. These DCT coefficients are inputted to the quantizer 112 and quantized with the quantization width S, so as to enter the VLC circuit 15. The quantization width S is herein set to 1 in the present embodiment.

The DCT circuit 111 of the difference signal encoder 8 needs to be fed with 8-bit precision picture data, that is picture data that can be represented by 8 bits of from 0 to 255, if the motion compensation mode is the intra-picture prediction mode, while it needs to be fed with 9-bit precision picture data, that is 8 bits plus sign bit, or −255 to 255, if the motion compensation mode is the inter-picture prediction mode, that is forward prediction mode, backward prediction mode or the bidirectional prediction mode.

That is, the bit precision of the picture data block inputted to the picture signal encoding apparatus needs to be converted from 10-bit precision to the 8-bit precision in order for the block to enter the difference signal encoder 8.

Thus, if the motion compensation mode is the intra-picture prediction mode, the maximum and minimum values of the outputs of the adder 3, herein the 10-bit precision picture data blocks from the field memory set 1, are detected by the representative value computing circuit 5, and the minimum value, for example, is outputted as representative value data of the output 10-bit precision picture data block of the adder 3 to the adders 4 and 11.

The representative value data in the block need not be the minimum value in the block. However, if the motion compensation mode is the intra-picture prediction mode, picture data need to be represented by 8 bits of from 0 to 255. Thus the dynamic range of the block, which will be explained subsequently, can be set to a maximum value if the minimum value of the block is used as the representative value of the block.

In the adder 4, the difference between the 10-bit precision picture data block, outputted by the adder 3 (respective pixel data in the block) and the representative value data of the block outputted by the representative value computing circuit 5, that is the minimum value of the block, is computed, and outputted to the block quantizer 7.

Thus, in the present case, a picture data block having 0 as a minimum value is outputted to the block quantizer 7.

That is, if the motion compensation mode is the intra-picture prediction mode, and the maximum or minimum value of the 10-bit picture data block outputted by the adder 3 is 500 or 300, respectively, as shown in FIG. 6A, a picture data block having a range of values of 0 (=300−300) to 200 (=500−300) as obtained by the picture data block less the minimum value as the representative value data, is outputted from the adder 4 to the block quantizer 7. On the other hand, if the maximum or minimum value of the 10-bit picture data block outputted by the adder 3 is 1000 or 300, respectively, as shown in FIG. 7A, a picture data block having a range of values of 0 (=300−300) to 700 (=1000−300) as obtained by the picture data block less the minimum value as the representative value data, is outputted from the adder 4 to the block quantizer 7.

Simultaneously, the quantization width computing circuit 6 detects the maximum and minimum values of the sum outputs of the adder 3, in this case, the 10-bit precision picture data block from the field memory set 1, and computes the difference thereof as the dynamic range.

The dynamic range of a signal herein means the difference between the maximum and minimum values of the signal.

The quantization width computing circuit 6 then judges whether or not the dynamic range of the 10-bit precision picture data block from the field memory set 1 is within 8 bits that can be represented by a range from 0 to 255. If the dynamic range is found to be within 8 bits, the quantization width is set to 1 which is outputted to the block quantizer 7.

Thus, if the motion compensation mode is the intra-picture prediction mode, and the dynamic range of the 10-bit precision picture data block from the field memory set 1 outputted by the adder 3 is within 8 bits, the bit precision of the picture data bock outputted by the adder 3 is substantially 8 bits. It is this 8-bit precision picture data block that is outputted to the difference signal encoder 8.

If the motion compensation mode is the intra-picture prediction mode, and the quantization width computing circuit 6 finds that the dynamic range of the 10-bit precision picture data block from the field memory set 1 exceeds 8 bits (256 or larger), the quantization width Q is determined so that the dynamic range of the quantized output of the block quantizer 7 will be 8 bits or less (255 or less). The quantization width so set is outputted to the block quantizer 7.

That is, if the dynamic range of the 10-bit precision picture data block from the field memory set 1 is not less than 256 and not larger than 512, the quantization width Q is set to 2. If the dynamic range is not less than 512 and not larger than 768, the quantization width Q is set to 3, whereas, if the dynamic range is not less than 768 and not larger than 1024, the quantization width Q is set to 4.

The method for quantization by the block quantizer 7 is explained. If the quantization width Q is 1, the block quantizer 7 performs no processing, so that the picture data from the adder 4 is directly outputted to the difference signal encoder 7.

If the quantization width Q is 2, picture data from the adder 4 is divided with the quantization width 4, and subdecimal values are discarded.

If the quantization width Q is 3, picture data x from the adder 4 is quantized with the quantization width 3 in accordance with the following equations (X):

$$X=(x+1)/3 \text{ for } x \geq 0$$

$$X=(x-1)/3 \text{ for } x<0$$

In this case, the subdecimal values are discarded.

If the quantization width Q is 4, picture data x from the adder 4 is quantized with the quantization width 4 in accordance with the following equations (X):

$$X=(x+1)/4 \text{ for } x \geq 0$$

$$X=(x-1)/4 \text{ for } x<0$$

In this case, the subdecimal values are discarded.

As a modification, the following quantization may be used for the quantization width Q of 4:

$$X=(x+2)/4 \text{ for } x \geq 0$$

$$X=(x-2)/4 \text{ for } x<0$$

However, the two cannot be used in combination.

As described above, if the motion compensation mode is the intra-picture prediction mode, and if the dynamic range of the 10-bit precision picture data block from the adder 4 exceeds 8 bits (256 or larger), the 10-bit precision picture data block from the adder 4 is converted by the block quantizer 7 into an 8-bit precision picture data block which is outputted to the difference signal encoder 8.

If the motion compensation mode is the inter-picture prediction mode, that is forward prediction, backward prediction or bidirectional prediction mode, the representative value computing circuit 5 detects the maximum and minimum values of the sum outputs of the adder 3, in this case the difference data between the 10-bit precision picture data block from the fed memory set 1 and the prediction picture, and an average value (=(maximum value+minimum value)/2, with subdecimal values being discarded) is outputted to the adders 4 and 11 as the representative value data of the 10-bit precision picture data outputted from the adder 3.

In this case, the representative value of a block may, for example, be the minimum value of the block or 0, instead of being an average value of the maximum and minimum values of the block (that is, pixels in the block). This average value is referred to hereinafter as an average value of the block. However, if the motion compensation mode is the inter-picture prediction mode, the dynamic range of the block can be selected to a maximum value if the average value of the block is used as the representative value f the block, because picture data need to be represented by nine bits for −255 to 255, as mentioned previously.

The subtractor 4 finds the difference between the block of 10-bit precision picture data (respective pixel data in the block) outputted by the adder 3 and the representative value data outputted by the representative value computing circuit 5, that is the average value of the block. This difference is outputted t the block quantizer 7.

In this case, a picture data block, in which the maximum and minimum values of picture data are equal to each other, is outputted to the block quantizer 7.

That is, if the motion compensation mode is the inter-picture prediction mode, and the maximum or minimum value of the 10-bit precision picture data block outputted by the adder 3 is −155 or 355, respectively, a picture data block having a value of from −255 (=155−100) to 255 (=355−100), obtained on subtracting an average value of 100 (=(−155+355)/2 as a representative value from the picture data block, is outputted from the adder 4 to the block quantizer 7, as shown in FIG. 6B. If the maximum or minimum value of the 10-bit precision picture data block outputted by the adder 3 is 1000 or −1000, respectively, a picture data block having a value of from −1000 (=−1000−0) to 1000 (=1000−0), with an average value of 0 (=−1000+1000)/2, is outputted from the adder 4 to the bloc quantizer 7, as shown in FIG. 7B.

Simultaneously, in this case, the quantization width computing circuit 6 detects the maximum and minimum values of sum outputs of the adder 3 (in this case, difference data between the 10-bit precision picture data block from the field memory set 1 and the prediction picture) and computes the difference thereof as the dynamic range.

It is judged by the quantization width computing circuit 6 whether or not the dynamic range of the 10-bit precision picture data block from the field memory set 1 is within 9 bits, inclusive of a sign bit, that can represent −255 to 255. If the dynamic range is found to be within 9 bits, the quantization width Q is set to 1, which is outputted to the block quantizer 7.

Therefore, if the motion compensation mode is the inter-picture prediction mode, and the dynamic range of the 10-bit imprecision picture data block (difference data block) is less than 9 bits (FIG. 6A), picture data from the adder 4 is directly outputted from the block quantizer 7 to the difference signal encoder 8.

That is, if the motion compensation mode is the inter-picture prediction mode, and the dynamic range of the 10-bit precision picture data block outputted by the adder 3 is less than 9 bits, the bit precision of the picture data block outputted by the adder 3 is substantially 8 bits, such that the 8-bit precision picture data block is outputted to the difference signal encoder 8.

Moreover, if the motion compensation mode is the inter-picture prediction mode, and the quantization width computing circuit 6 finds that the dynamic range of the of the 10-bit precision picture data block from the field memory set 1 exceeds 9 bits (exceeds the range of from −255 to 255), the quantization width Q is set so that the dynamic range of the quantized output of the block quantizer 7 will be not more than 9 bits (less than 511 or in a range of from −255 to 255). The quantization width Q so set is outputted to the block quantizer 7.

That is, if the dynamic range of 10-bit precision picture data block from the field memory set 1 is not less than 512 and less than 1024, the quantization width Q is set to 2. If the dynamic range is not less than 1024 and less than 1536, the quantization width Q is set to 3 and, if the dynamic range is not less than 1536 and less than 2048, the quantization width Q is set to 4.

If the motion compensation mode is the inter-picture prediction mode, the block quantizer 7 operates in the same way and the quantization method is also the same.

As described above, if the motion compensation mode is the inter-picture prediction mode, and the dynamic range of the 10-bit precision picture data from the subtractor 4 exceeds 9 bits (exceeds 512), the 10-bit precision picture data from the subtractor 4 is converted into an 8-bit precision picture data, which is outputted to the difference signal encoder 8.

As described above, if a 10-bit precision picture data block is inputted to the picture signal encoding apparatus, the subtractor 4 and the block quantizer 8 convert the 10-bit precision picture data block into an 8-bit precision picture data block so that the 8-bit precision picture data block will enter the difference signal encoder 8.

Meanwhile, if the high precision picture of higher precision than the 8-bit precision data, such as 10-bit precision picture, is subdivided into small sub-blocks, such as 8×8 pixel or 16×16 pixel sub-blocks, the dynamic range in each block is usually not large (that is, if the motion compensation mode is the intra-picture prediction mode or the inter-picture prediction mode, the dynamic range of the block sometimes becomes less than 8 bits or 9 bits, respectively). Moreover, if the motion compensation mode is the inter-picture prediction mode, the difference of a picture data block from a prediction picture is taken in the subtractor 3, so that the dynamic range of the difference block rarely exceeds 9 bits.

Therefore, by the subtraction operation of representative value data from the block of the picture data in the adder 4, 10-bit precision picture data can be converted into 8-bit precision picture data in a majority of cases without impairing the information.

That is, if the apparatus is constituted without providing the quantization width computing circuit 6 or the block quantizer 7, 10-bit precision picture data can be converted into 8-bit precision picture data without impairing the picture.

If the dynamic range of the picture data block is larger, that is if the dynamic range exceeds 8 bits when the motion compensation mode is the intra-picture prediction mode or if the dynamic range exceeds 9 bits when the motion compensation mode is the inter-picture prediction mode, picture data quantized by the block quantizer 7 and decoded is deteriorated slightly in resolution.

However, if the dynamic range is larger, such as in a contour of a picture, the human eye is low in the ability of luminance discrimination. Therefore, the effect on the viewer of the degraded resolution in the level direction due to quantization is thought to be negligible.

The picture data, converted from the 10-bit precision data into the 8-bit precision data, is supplied to the difference signal encoder 8. The picture data is further DCTed in the difference signal encoder 8 and quantized so as to be supplied to the VLC circuit 15.

The VLC circuit 15 is fed with a picture data block DCTed and quantized by the difference signal encoder 8. In addition, the representative value data or the quantization width Q of the block are supplied to the VLC circuit 15 from the representative value computing circuit 5 or the quantization width computing circuit 6, respectively. Moreover, the motion vector and the motion compensation mode are supplied to the VLC circuit from the circuitry for motion prediction. The quantization width S in the difference signal encoder 8 is also supplied to the VLC circuit 15. On the other hand, the VLC circuit 15 variable-length encodes the picture data block, the bit precision of which has been converted from 10-bit precision to the 8-bit precision, the representative value data for the block, the quantization width Q, motion vector and the motion compensation mode, and outputs the resulting data via a transmission buffer, not shown.

In this case, the VLC circuit 15 appends the representative value data or the quantization width Q to a header of each encoded picture data block.

The representative value data or the quantization width Q may also be appended, along with the representative value data or the quantization width Q of another block belonging to an upper order layer than the block, such as a macro-block layer or picture layer, to the header of the macro-block layer or to the picture layer, instead of to the header of the block, as described above.

The VLC circuit 15 outputs bitstream as an encoder output signal.

If the picture data DCTed by the difference signal encoder 8 and quantized is the I- or P-picture data, it is sent to a difference signal decoder 9.

The difference signal decoder 9 is made up of a dequantizer 113 and an inverse DCT circuit 114, where the data from the difference signal encoder 8 (quantized DCT data) is dequantized with the same quantization width as the quantization width S (that is, the quantization width S is 1) in the difference signal encoder 8 and further processed with inverse DCT.

The picture data outputted by the difference signal decoder 9 is inputted to the block dequantizer 10 so as to be dequantized with the same quantization width as the quantization width Q in the block quantizer 7 outputted by the quantization width computing circuit 6. That is, the picture data outputted by the difference signal decoder 9 is multiplied with the quantization width which is the same as the quantization width Q in the block quantizer 7 and outputted to an adder 11.

In the adder 1, the representative value data which is the same as the representative value data from the representative value computing circuit 5 subtracted from the sum output of the adder 3 is summed to the picture data outputted from the block dequantizer 10 to give a sum which is fed to the adders 70 and 72.

Thus a block of picture data which is the same as, more precisely, substantially the same as the block of 10-bit precision picture data prevailing prior to conversion by the subtractor 4 and the block quantizer 7 into 8-bit precision picture data block, is supplied to the subtractor 70 and to the adder 72. The block of picture data is substantially the same as the block of 10-bit precision picture data prevailing prior to conversion because the picture block contains the quantization error.

The signal S2 outputted from the adder 11 is outputted to the subtractor 70 and to the adder 72. The subtractor 70 computes a difference S3 between a signal S1 from the adder 3 and a signal S2 from the adder 11 by the following calculation:

$$S3 = S1 - S2$$

and outputs the difference signal S3 to the variable length encoding circuit 71 and to the adder 72.

The VLC circuit 71 variable-length encodes the difference signal S3 from the subtractor 70 and outputs its output bitstream (corrected bitstream) via transmission buffer 73 as the transmission data which is transmitted over a transmission channel 74 to the receiving side or recorded on the recording medium 75.

The adder 72 sums the signal S2 from the adder 11 to the signal S3 from the subtractor 70 and outputs the resulting sum signal to an adder 12.

The above processing corrects the information lost by the DCT processing and the processing of converting the 10-bit picture signal to the 8-bit picture signal so that a signal coincident with the original signal S1 is inputted to the adder 12.

To the adder 12 is supplied a prediction picture previously decoded and motion-compensated by the motion compensation circuit 14. Thus the prediction picture is summed to the picture data from the adder 11 for decoding the original 10-bit precision picture data (10-bit precision picture data prevailing prior to decoding). The decoded 10-bit precision picture data is supplied to a field memory set 13 for storage therein.

The field memory set 13 is configured for storing 10-bit precision picture data. The previously decoded 10-bit picture data, stored in the field memory set 13, is read out based on a timing control signal generated in keeping with the synchronization signal of the input picture by a field memory controller 16. The picture signal, thus read ut, is motion-compensated in the motion compensation circuit 14 in meeting with the motion vector from the motion prediction circuit 2 so as to be supplied to the adders 3 and 12. Specifically, the prediction picture is fed to the adders 3 and 12.

Since the 10-bit precision picture data is converted in this manner to the 8-bit precision picture data, the 10-bit precision picture can be reversibly coded, without degrading the picture quality, by the picture encoding apparatus employing the motion prediction circuit 2, difference signal encoder 8 and the difference signal decoder 9 for 8-bit precision picture data.

FIG. 8 shows, in a block diagram, the configuration of an example of a picture signal decoding apparatus, as a counterpart of the picture signal encoding apparatus, according to a third embodiment of the present invention.

The picture signal decoding apparatus shown in FIG. 8 is configured for decoding a picture encoded by the picture signal encoding apparatus shown in FIG. 5.

The picture data encoded by the picture signal encoding apparatus of FIG. 5 and transmitted over the transmission channel 74, or the encoded picture data recorded on the recording medium 75, is received by a reception circuit, not shown, or reproduced by a reproducing apparatus, so as to be supplied to a variable length decoding (inverse VLC) circuit 21. The variable length decoding circuit 21 variable-length decodes a bitstream of encoded picture data and sends block representative value data or the quantization width Q of the picture data, appended to the block-based header, to the adder 24 or to the block dequantizer 23, while supplying the motion vector and the motion compensation mode to a motion compensation circuit 27. The variable length decoding circuit 21 sends the decoded (that is, variable-length decoded) picture data block and the quantization width S to a difference signal decoder 22.

Moreover, the variable length decoding circuit 21 outputs a timing pulse to a memory controller 28 each time variable length decoding of data corresponding to a picture comes to a close. The memory controller 28 is configured for sending a timing control signal to a set of field memories 26 responsive to the timing pulse for controlling the picture data readout timing from the field memory set 26.

Similarly to the difference signal decoder 9 of FIG. 5, the difference signal decoder 22 is made up of a dequantizer 121 and an inverse DCT circuit 122. The dequantizer 121 dequantizes picture data supplied from the variable length decoding circuit 21 in accordance with the quantization width S supplied from the dequantizer 121 and outputs the dequantized picture data to the inverse DCT circuit 122. Output data of the dequantizer 121 (DCT coefficients) are processed by inverse DCT processing at an inverse DCT circuit 122.

Since the picture data entering or exiting the difference signal decoder 22 is the data converted in bit precision to 8-bit precision, it is possible for the difference signal decoder 22 to dequantize the 8-bit precision picture data in the same way as n FIG. 5, and to process the resulting data by inverse DCT.

The picture data block outputted by the difference signal decoder 22 is sent to the block dequantizer 23 so as to be dequantized with the same quantization width as the quantization width Q used in the block quantizer 7 (FIG. 5). This quantization width Q is outputted by the variable length decoding circuit 21. Specifically, the picture data outputted by the difference signal decoder 22 is multiplied in the block dequantizer 23 with a quantization width equal to the quantization width Q used in the block quantizer 23.

This converts the dynamic range of the block of the picture data to the same value as that prevailing prior to encoding by the picture signal encoding apparatus of FIG. 5.

The picture data block, dequantized by the block dequantizer 23, is sent to the adder 24 where the representative value data from the variable length decoding circuit 21 is summed to the picture data block (respective pixel data in the block) from the block dequantizer 23 to give sum data which is outputted via adder 93 to an adder 25.

A difference bit stream, variable-length encoded by the VLC circuit 71 of the picture signal encoding apparatus of FIG. 5 and supplied from the transmission channel 74 or recorded on the recording medium 75, is inputted to the reception buffer 91. A variable length decoding circuit 92 reads out a difference bitstream from the reception buffer 91 to variable-length decode the bitstream. The variable length decoding circuit 92 is a counterpart of the VLC circuit 71 of the picture signal encoding apparatus of FIG. 5 and performs an operation which is the reverse of the operation of the VLC circuit 71.

An output signal S3' of the variable length decoding circuit 92 coincides with the signal S3 in the picture signal encoding apparatus, while an output signal S2' from the adder 24 coincides with the signal S2 in the picture signal encoding apparatus. The adder 93 sums the output S3' of the variable length decoding circuit 92 to the output signal S2' of the adder 24 to output the resulting sum signal as a signal S1'. This signal S1' coincides with the signal St in the picture signal encoding apparatus of FIG. 1.

The adder 25 is fed with a prediction picture which is the picture data of the previously decoded I- or P-picture motion-compensated by the motion compensation circuit 27. The adder 25 sums the prediction picture to picture data from the adder 24 for decoding into the original 10-bit precision picture data (10-bit precision picture data prevailing prior to encoding). The 10-bit precision picture data, thus decoded, is sent to and stored in the field memory set 26.

The field memory set 26 is configured for storing 10-bit precision picture data and stores the decoded 10-bit precision picture data from the adder 25. The I- or P-picture data of the previously decoded 10-bit picture data is read out based on the timing control signal generated by the field memory controller 28 in keeping with the synchronization signal of the input picture. The picture data, thus read out, is motion-compensated in congruity with the motion vector from the motion prediction circuit 2 and fed to the adder 25. That is, the prediction picture is sent to the adder 25.

The picture data stored n the field memory set 26 is outputted to an output terminal based on the timing signal from the field memory controller 28. The picture data outputted at an output terminal is processed with, for example, D/A conversion, and sent to a display unit, not shown, for display.

As described above, the 10-bit precision picture, higher in precision than the 8-bit precision picture encoded by the picture signal encoding apparatus of FIG. 5, can be decoded by the picture decoding apparatus employing the difference signal decoder 22 for 8-bit precision picture data. The decoded picture fully coincides with the original picture.

In the picture signal encoding apparatus of FIG. 5 or in the picture signal decoding apparatus of FIG. 8, 9-bit or 11-bit imprecision pictures, for example, may be encoded or decoded in place of the 10-bit precision pictures.

Figure 9:
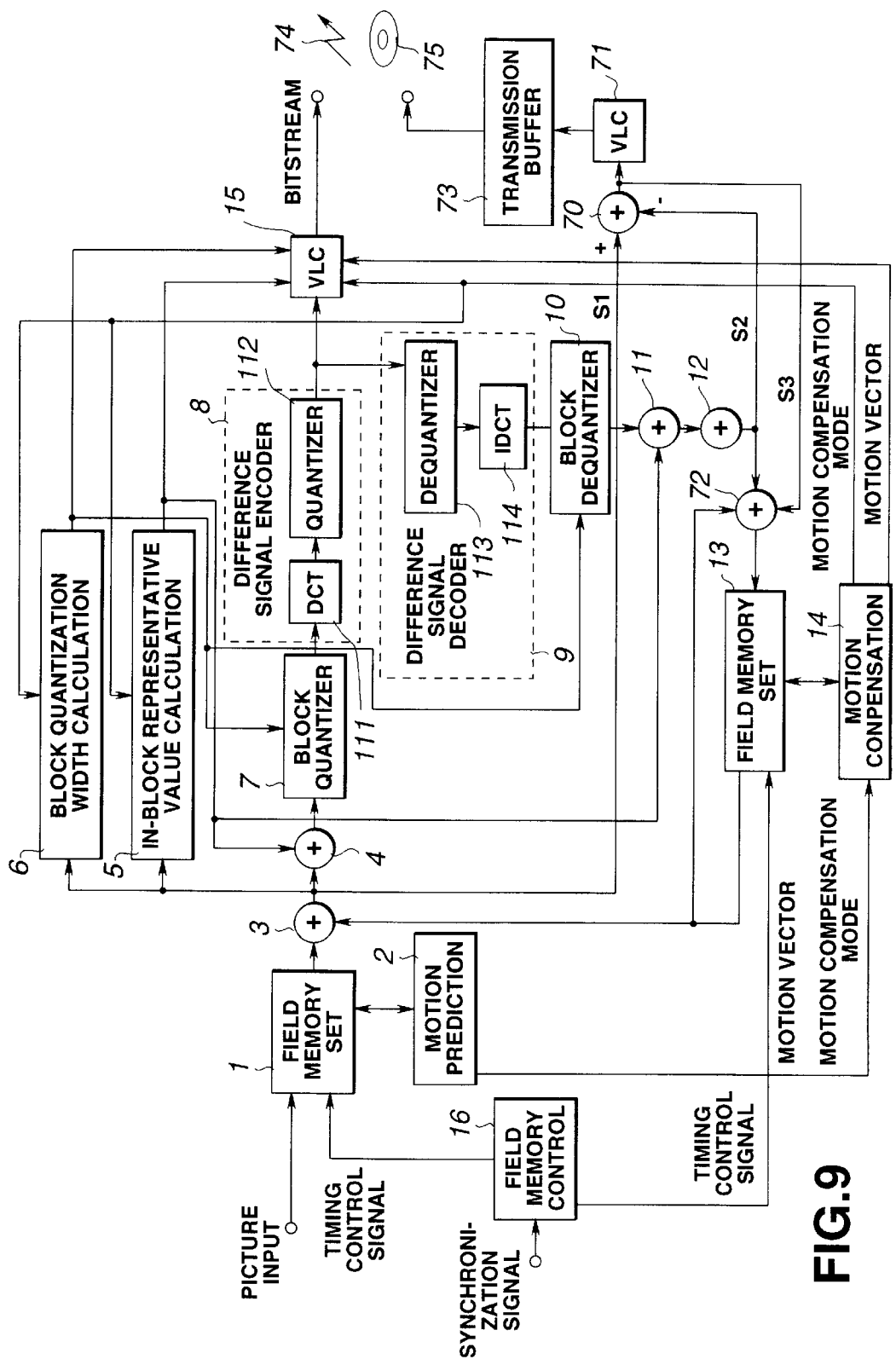
FIG. 9 is a block diagram showing the structure of a picture signal encoding apparatus according to a fourth embodiment of the present invention.
Figure 10:
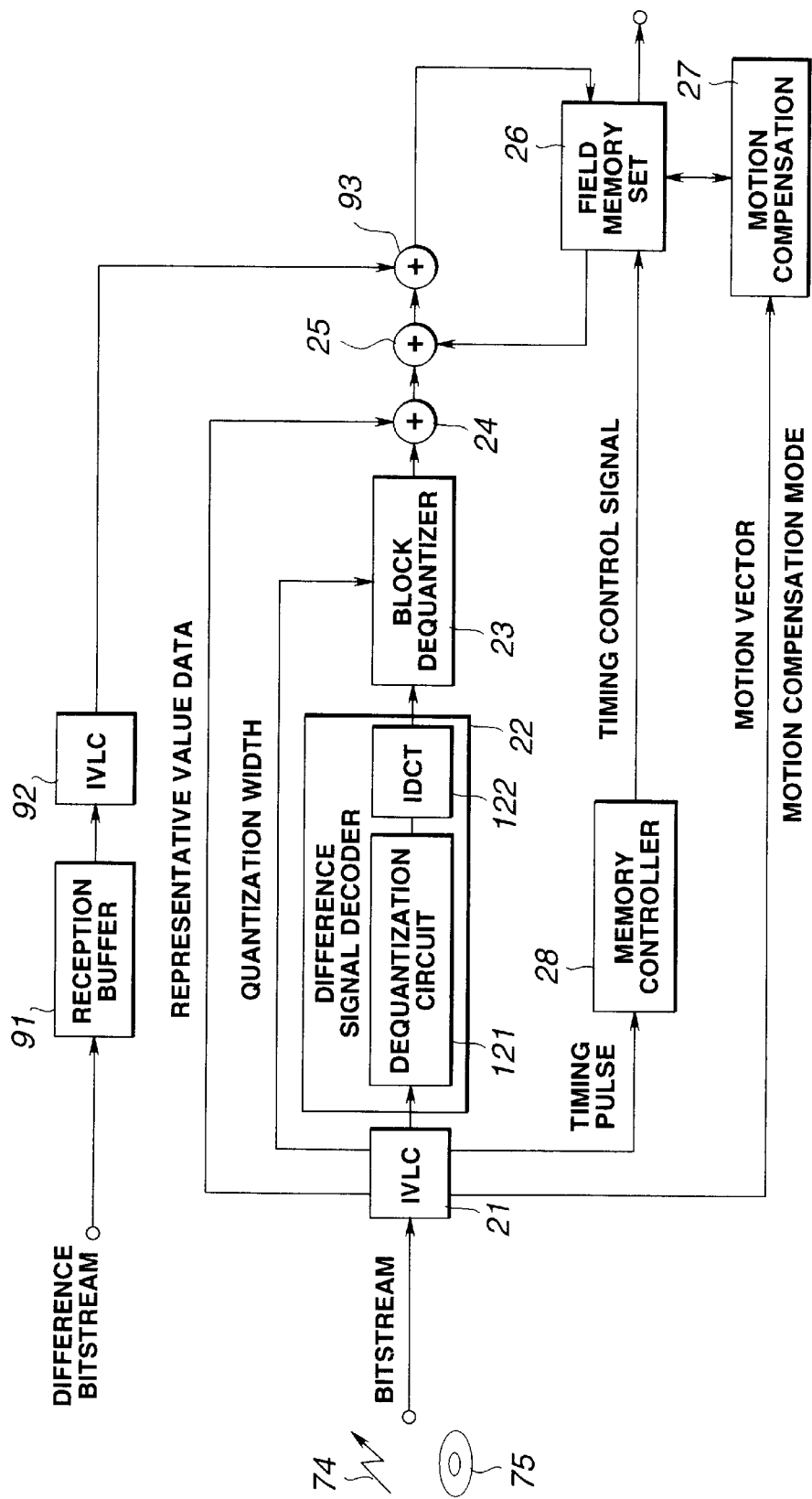
FIG. 10 is a block diagram showing the structure of a picture signal decoding apparatus according to a fourth embodiment of the present invention.

Referring to FIGS. 9 and 10, a fourth embodiment of the present invention is explained in detail.

FIG. 9 shows a picture signal encoding apparatus according to a fourth embodiment of the present invention.

In the picture signal encoding apparatus of FIG. 9, it is assumed for explanation that picture data of higher precision than the 8-bit precision data, such as 10-bit precision data, is fed to the apparatus. Although an illustrative example of 10-bit picture signal is explained in the present embodiment, the present invention may be applied to 9- or 11-bit precision picture signals.

The picture signal encoding apparatus shown in FIG. 9 is configured substantially similarly to the picture signal encoding apparatus of FIG. 5, so that only the portions different from the configuration of FIG. 5 are explained and the remaining portions are not explained.

The 10-bit picture data, read out from the field memory set 1 of FIG. 9, is outputted to the adder 3 and also to the subtractor 70 as signal S1. The adder 70 is fed with the output signal S2 of the adder 12.

The output signal S2 of the adder 11 is directly supplied to the adder 12 without interposition of the adder 72 of FIG. 5, so that the supplied data is the picture data block which is the same as the picture data block of 10-bit precision prevailing prior to conversion into 8-bit precision picture data by the subtractor 4 and the block quantizer 7. More precisely, the picture data block supplied is substantially the same as the picture data block of 10-bit precision prevailing prior to conversion because the signal contains the quantization error. The adder 12 is fed with a prediction picture which is previously decoded and motion-compensated by the motion compensation circuit 14 so that the prediction picture and the picture data from the adder 11 are summed to each other for decoding into the original 10-bit precision picture data (10-bit precision picture data prevailing prior to encoding).

In the embodiment of FIG. 9, the 10-bot precision picture data, thus decoded, is supplied to the subtractor 70 and to the adder 72.

The subtractor 70 finds the difference S3 between the signal inputted to the adder 3 and the signal S2 from the adder 12 by the following operation:

S3=S1−S2

The difference data S3 is outputted to the VLC circuit 71 and to the adder 72.

The VLC circuit 71 variable-length encodes the difference signal S3 from the adder 70 and outputs the output bitstream (corrected bitstream) via transmission buffer 73.

The adder 72 sums the signal S2 from the adder 12 and the signal S3 from the subtractor 70 to give a sum signal which is outputted to the adder 12.

By the above processing, the information lost by the DCT processing and the processing for converting the 10-bit picture signal to the 8-bit picture signal can be corrected and the signal S1 coincident with the original signal is supplied to and stored in the field memory set 13.

The field memory set 13 is configured for storing 10-bit precision picture data. The 10-bit picture data, stored in the field memory set 13 and already decoded, is read out based on the timing control signal generated in congruity with the synchronization signal of the input picture by the field memory controller 16. The picture data, thus read out, is motion-compensated in the motion compensation circuit 14 in keeping with the motion vector from the motion prediction circuit 2 and sent to the adders 3 and 12. That is, a prediction picture is sent to the adders 3 and 12.

As described above, since the 10-bit precision picture data is converted into 8-bit precision picture data, the 10-bit precision picture can be reversibly encoded, without degrading the picture quality, by the picture encoding apparatus employing the motion prediction circuit 2, difference signal encoder 8 and the difference signal decoder 9.

FIG. 10 shows, in a block diagram, the configuration of a picture signal encoding apparatus according to a fourth embodiment of the present invention.

In this figure, the parts or components corresponding to those of FIG. 8 are denoted by the same numerals and the description therefor is omitted for simplicity. The picture signal decoding apparatus of FIG. 10 is configured for decoding the picture encoded by the picture signal encoding apparatus shown in FIG. 9.

The signal decoding apparatus shown in FIG. 10 differs from the configuration of FIG. 8 as to the position of insertion of the adder 93. That is, an output of the adder 24 is directly sent to the adder 25, an output signal S2' of which is sent to the adder 93. The adder 93 sums the difference signal S3' from the variable length decoding circuit 92 to the output signal S2' from the adder 25. An output signal S1' of the adder 93 is sent to the field memory set 26.

That is, the picture data block dequantized by the block dequantizer 23 is sent to the adder 24 which then sums the representative value data from the variable length decoding circuit 21 to the picture data block (respective pixel data in the block) from the block dequantizer 23. The resulting sum data is outputted to the adder 25.

The adder 25 is also fed with a prediction picture obtained on motion compensation of picture data of the previously decoded I- or P-picture. The adder sums the prediction picture to the picture data from the adder 24 for decoding into the original 10-bit precision picture data (10-bit precision picture data prevailing prior to encoding). The decoded 10-bit precision picture data is inputted to the adder 93.

The difference bitstream, variable-length encoded by the variable length encoding circuit (VLC) 71 of the picture signal encoding apparatus of FIG. 9 and supplied from the transmission channel 74 or recorded on the recording medium 75, is inputted to the reception buffer 91 of FIG. 10. The variable length decoding circuit 92 reads out the difference bitstream from the reception buffer 91 and decodes the bitstream. The variable length decoding circuit 92 is a counterpart of the variable length encoding circuit 71 in the picture signal encoding apparatus and performs an operation which is reversed from that performed by the variable length encoding circuit 71.

The output signal S3' of the variable length decoding circuit 92 coincides with the signal S3 of the encoding apparatus of FIG. 9, while the output signal S2' of the adder 24 coincides with the signal S2 in the encoding apparatus of FIG. 9. The adder 93 sums the output S3' of the variable length decoding circuit 92 to the output signal S2' of the adder 24 to output a signal S1' which is coincident with the signal S1 of the encoding apparatus of FIG. 9.

The output signal of the adder 93 is sent to and stored in the field memory set 26. The field memory set 26 is configured for storing 10-bit precision picture data and stores the decoded 10-bit precision picture data from the adder 25. Of the previously decoded 10-bit picture data, stored in the field memory set 26, picture data of the I- or P-picture is read out based on the timing control signal generated in keeping with the synchronization signal of the input picture by the field memory controller 28. The picture data, thus read out, is motion-compensated by the motion compensator 14 in keeping with the motion vector from the motion prediction circuit 2 so as to be supplied to the adder 25. That is, the prediction picture is supplied to the adder 25.

The picture data stored in the field memory set 26 is outputted to an output terminal based on a timing control signal from the field memory controller 28. The picture data outputted to the output terminal is processed in a pre-set manner, such as by D/A conversion, and supplied to a display unit, not shown, for display.

By the above processing, the 10-bit precision picture of higher precision than 8-bit data, obtained on encoding by the picture signal encoding apparatus of FIG. 9, may be decoded by the picture signal decoding apparatus employing the difference signal decoder 22 for the 8-bit precision picture data or the like, while the decoded picture fully coincides with the original picture.

In the picture signal encoding apparatus of FIG. 9 or in the picture signal decoding apparatus of FIG. 10, 9-bit or 11-bit precision pictures, for example, may be encoded or decoded in place of the 10-bit precision pictures.

The present invention is not limited to the above-described embodiments. For example, although the above-described embodiments are directed to a picture signal encoding/decoding apparatus for realizing reversible encoding by transmitting a signal for correcting the information lost by the DCT processing, the present invention may also be applied to degrading elements other than DCT processing. Although the quantization scale in the above-described embodiments is set to 1, the quantization scale may also be other than 1. Various other modifications are also possible without departing from the scope of the invention.

What is claimed is:

1. A picture signal encoding method for use with an encoding apparatus, said method comprising the steps of:

processing an input picture signal for one of intra-picture prediction, forward prediction, backward prediction, and bi-directional prediction in accordance with a control signal to form a predicted picture signal and for processing the predicted picture signal with encoding accompanying real-number calculations for generating encoded data;

supplying an encoded signal corresponding to the encoded data to a first transmission buffer;

locally decoding the encoded data for generating locally decoded data;

determining a difference between the locally decoded data and picture data prevailing prior to performing real-number calculations, said difference being representative of information lost from the input picture signal; and supplying a difference signal representative of said difference to a second transmission buffer;

wherein the encoded signal and said difference signal are usable with a decoding apparatus such that the encoded data is decoded in a manner similar to that performed in the locally decoding step so as to obtain second decoded data with lost information corresponding to the information lost during the encoding method and such that said difference is combined with the second decoded data so as to obtain the picture data.

2. The picture signal encoding method as claimed in claim 1 wherein said real-number calculations consist in discrete cosine transform.

3. The picture signal encoding method as claimed in claim 1 wherein said locally decoded data is data directly following the real-number calculations.

4. The picture signal encoding method as claimed in claim 1 wherein said encoding is the processing of predictive encoding followed by real-number calculations and wherein said locally decoded data is data restored after addition thereto of a prediction signal of predictive encoding.

5. The picture signal encoding method as claimed in claim 1 wherein said encoding is the processing of performing real-number calculations on the difference between the representative value data determined from one pre-set block of the input picture data to another and the original input picture data.

6. A picture signal encoding apparatus comprising:

means for processing an input picture signal for one of intra-picture prediction, forward prediction, backward prediction, and bi-directional prediction in accordance with a control signal to form a predicted picture signal and for processing the predicted picture signal with encoding accompanying real-number calculations for generating encoded data;

means for supplying an encoded signal corresponding to the encoded data to a first transmission buffer;

means for locally decoding the encoded data for generating locally decoded data;

means for determining a difference between the locally decoded data and picture data prevailing prior to performing the real-number calculations, said difference being representative of information lost from the input picture signal; and means for supplying a difference signal representative of said difference to a second transmission buffer;

wherein the encoded signal and said difference signal are usable with a decoding apparatus such that the encoded data is decoded in a manner similar to that performed in the locally decoding step so as to obtain second decoded data with lost information corresponding to the information lost during the operations performed by the encoding apparatus and such that said difference is combined with the second decoded data so as to obtain the picture data.

7. The picture signal encoding apparatus as claimed in claim 6 wherein said real-number calculations consist in discrete cosine transform.

8. The picture signal encoding apparatus as claimed in claim 6 wherein said locally decoded data is data directly following the real-number calculations.

9. The picture signal encoding apparatus as claimed in claim 6 wherein said encoding is the processing of predictive encoding followed by real-number calculations and wherein said locally decoded data is data restored after addition thereto of a prediction signal of predictive encoding.

10. The picture signal encoding apparatus as claimed in claim 6 wherein said encoding is the processing of performing real-number calculations on the difference between the representative value data determined from one pre-set block of the input picture data to another and the original input picture data.

11. A picture signal transmitting method for use with a transmitting apparatus, said method comprising the steps of:

processing an input picture signal for one of intra-picture prediction, forward prediction, backward prediction, and bi-directional prediction in accordance with a control signal to form a predicted picture signal and for processing the predicted picture signal with encoding accompanying real-number calculations for generating encoded data;

supplying an encoded signal corresponding to the encoded data to a first transmission buffer for storage thereat;

obtaining the encoded signal stored in the first transmission buffer and transmitting the same;

locally decoding the encoded data for generating locally decoded data;

determining a difference between the locally decoded data and picture data prevailing prior to performing the real-number calculations, said difference being representative of information lost from the input picture signal;

supplying a difference signal representative of said difference to a second transmission buffer for storing thereat; and obtaining the difference signal stored in the second transmission buffer and transmitting the same;

wherein the transmitted encoded signal and transmitted difference signal are usable with a receiving apparatus such that said transmitted encoded data is decoded in a manner similar to that performed in the locally decoding step so as to obtain second decoded data with lost information corresponding to the information lost during the transmitting method and such that said transmitted difference signal is processed so as to obtain said difference which is combined with the second decoded data so as to obtain the picture data.

12. The picture signal transmitting method as claimed in claim 11 wherein said real-number calculations consist in discrete cosine transform.

13. The picture signal transmitting method as claimed in claim 11 wherein said locally decoded data is data directly following the real-number calculations.

14. The picture signal transmitting method as claimed in claim 11 wherein said encoding is the processing of predictive encoding followed by real-number calculations and wherein said locally decoded data is data restored after addition thereto of a prediction signal of predictive encoding.

15. The picture signal transmitting method as claimed in claim 11 wherein said encoding is the processing of performing real-number calculations on the difference between the representative value data determined from one pre-set block of the input picture data to another and the original input picture data.

16. A recording medium decodable by a decoding apparatus in which the recording medium has recorded signals decodable by said decoding apparatus, said recorded signals including an encoded signal and difference data, said recorded signal being recorded by a method comprising the steps of:

processing an input picture signal for one of intra-picture prediction, forward prediction, backward prediction, and bidirectional prediction in accordance with a control signal to form a predicted picture signal and for processing the predicted picture signal with encoding accompanying real-number calculations for generating encoded data;

supplying an encoded signal corresponding to the encoded data to a first transmission buffer;

locally decoding the encoded data for generating locally decoded data;

determining a difference between the locally decoded data and picture data prevailing prior to performing the real-number calculations, said difference being representative of information lost from the input picture signal; and supplying a difference signal representative of said difference to a second transmission buffer;

wherein the decoding apparatus is adaptable to decode the encoded data in a manner similar to that performed in the locally decoding step so as to obtain second decoded data with lost information corresponding to the information lost during the recording method and to combine said difference with the second decoded data so as to obtain the picture data.

17. A picture signal decoding method in which original picture data is restored by decoding an encoded signal obtained by processing input picture signals for one of intra-picture prediction, forward prediction, backward prediction, and bi-directional prediction in accordance with a control signal to form a predicted picture signal and for processing the predicted picture signal with accompanying real-number calculations and difference data signals obtained from a difference between locally decoded data of encoded data corresponding to the encoded signal and picture data prevailing prior to performing said real-number calculations, said difference being representative of information lost from the input picture signals, comprising the steps of:

receiving said encoded signal at a first reception buffer;

decoding the received encoded data by decoding as a counterpart of the encoding for generating decoded data with lost information which corresponds to the information lost prior to performing the decoding method;

receiving the difference data signals at a second reception buffer; and summing a signal corresponding to the received difference data signals to said decoded data so as to obtain the original picture data.

18. The picture signal decoding method as claimed in claim 17 wherein said decoding includes at least discrete cosine transform.

19. A picture signal decoding apparatus in which original picture data is restored by decoding an encoded signal obtained by processing input picture signals for one of intra-picture prediction, forward prediction, backward prediction, and bi-directional prediction in accordance with a control signal to form a predicted picture signal and for processing the predicted picture signal with accompanying real-number calculations and difference data signals obtained from a difference between locally decoded data of encoded data corresponding to the encoded signal and picture data prevailing prior to performing said real-number calculations, said difference being representative of information lost from the input picture signals, comprising:

means for receiving said encoded signal at a first reception buffer;

means for decoding the received encoded data by decoding as a counterpart of the encoding for generating decoded data with lost information which corresponds to the information lost prior to operations performed by the decoding apparatus;

means for receiving the difference data signals at a second reception buffer; and means for summing a signal corresponding to the received difference data signals to said decoded data so as to obtain the original picture data.

20. The picture signal decoding apparatus as claimed in claim 19 wherein said decoding includes at least discrete cosine transform.

21. A picture signal encoding method for use with an encoding apparatus, said method comprising the steps of:

processing a picture signal for one of intra-picture prediction, forward prediction, backward prediction, and bi-directional prediction in accordance with a control signal to form a predicted picture signal and for encoding the predicted picture signal so as to obtain encoded data, in which said encoding includes performing a discrete cosine transform;

supplying an encoded signal corresponding to the encoded data to a first transmission buffer;

locally decoding the encoded data to form locally decoded data;

determining a difference between the locally decoded data and said picture signal, said difference being representative of information lost from said picture signal; and supplying a difference signal representative of said difference to a second transmission buffer;

wherein the processing and encoding step, the encoded data supplying step, the locally decoding step, the difference signal supplying step and the determining step are performed by said encoding apparatus.

22. A picture signal encoding apparatus comprising:

means for processing a picture signal for one of intra-picture prediction, forward prediction, backward prediction, and bi-directional prediction in accordance with a control signal to form a predicted picture signal and for encoding the predicted picture signal so as to obtain encoded data, in which the encoding means performs a discrete cosine transform;

means for supplying an encoded signal corresponding to the encoded data to a first transmission buffer;

means for locally decoding the encoded data to form locally decoded data;

means for determining a difference between the locally decoded data and said picture signal, said difference being representative of information lost from said picture signal; and means for supplying a difference signal representative of said difference to a second transmission buffer.

23. A picture signal transmitting method for use with a transmitting apparatus, said method comprising:

processing a picture signal for one of intra-picture prediction, forward prediction, backward prediction, and bi-directional prediction in accordance with a control signal to form a predicted picture signal and for encoding the predicted picture signal so as to obtain encoded data, in which said encoding includes performing a discrete cosine transform;

supplying an encoded signal corresponding to the encoded data to a first transmission buffer for storage thereat;

obtaining the encoded signal stored in the first transmission buffer and transmitting the same;

locally decoding the encoded data to form locally decoded data;

determining a difference between the locally decoded data and said picture signal, said difference being representative of information lost from said picture signal;

supplying a difference signal representative of said difference to a second transmission buffer for storage thereat; and obtaining the difference signal stored in the second transmission buffer and transmitting the same;

wherein the processing and encoding step, the encoded data supplying step, the locally decoding step, the determining step and the difference signal supplying step are performed in said transmitting apparatus.

* * * * *